United States Patent
Kim et al.

(10) Patent No.: US 11,333,884 B2
(45) Date of Patent: *May 17, 2022

(54) HEAD UP DISPLAY FOR VEHICLE

(71) Applicant: LG ELECTRONICS INC., Seoul (KR)

(72) Inventors: Youngjin Kim, Seoul (KR); Dongwook Kim, Seoul (KR); Juhyeok Ryu, Seoul (KR); Sangok Yeo, Seoul (KR); Kyoungil Lee, Seoul (KR); Seunggyu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 307 days.

This patent is subject to a terminal disclaimer.

(21) Appl. No.: 16/487,709

(22) PCT Filed: Jun. 13, 2017

(86) PCT No.: PCT/KR2017/006122
§ 371 (c)(1),
(2) Date: Aug. 21, 2019

(87) PCT Pub. No.: WO2018/155766
PCT Pub. Date: Aug. 30, 2018

(65) Prior Publication Data
US 2020/0026075 A1    Jan. 23, 2020

(30) Foreign Application Priority Data

Feb. 23, 2017 (KR) .................. 10-2017-0024205

(51) Int. Cl.
G02B 27/14      (2006.01)
G03H 1/00       (2006.01)
(Continued)

(52) U.S. Cl.
CPC .......... G02B 27/0101 (2013.01); B60K 35/00 (2013.01); G02B 27/0149 (2013.01);
(Continued)

(58) Field of Classification Search
CPC ......... G01S 11/12; G01S 1/02; G05D 1/0038; G05D 1/0246; G02B 27/144;
(Continued)

(56) References Cited

U.S. PATENT DOCUMENTS

2015/0061976 A1    3/2015  Ferri
2015/0234185 A1    8/2015  Inomata
(Continued)

FOREIGN PATENT DOCUMENTS

JP    2002-303822 A    10/2002
JP     2006-91489 A     4/2006
(Continued)

*Primary Examiner* — Dawayne Pinkney
(74) *Attorney, Agent, or Firm* — Birch, Stewart, Kolasch & Birch, LLP

(57) ABSTRACT

A head-up display for a vehicle, according to one embodiment of the present invention, may comprise: an image source which emits a linearly-polarized light having a first direction; a prism which refracts one portion of the linearly-polarized light emitted from the image source; an electric polarization conversion element which, when turned off, transmits another portion of the linearly-polarized light emitted from the image source, and when turned on, half-wavelength-converts the another portion of the linearly-polarized light emitted from the image source into a linearly-polarized light having a second direction orthogonal to the first direction; a first reflection mirror which reflects light to a windshield of a vehicle; a polarization reflection mirror which is disposed so as to be spaced apart from the first reflection mirror, reflects the linearly-polarized light having the first direction, and transmits the linearly-polarized light having the second direction; and a second reflection mirror (Continued)

which is disposed so as to be spaced apart from the polarization reflection mirror, and reflects the light transmitted through the polarization reflection mirror to the polarization reflection mirror.

16 Claims, 14 Drawing Sheets

(51) Int. Cl.

| | | |
|---|---|---|
| *G02F 1/03* | (2006.01) | |
| *G09G 5/00* | (2006.01) | |
| *H04N 7/00* | (2011.01) | |
| *G02F 1/1335* | (2006.01) | |
| *G02B 27/01* | (2006.01) | |
| *B60K 35/00* | (2006.01) | |
| *G02B 27/28* | (2006.01) | |

(52) U.S. Cl.
CPC .......... *G02B 27/283* (2013.01); *G02B 27/286* (2013.01); *B60K 2370/1529* (2019.05); *B60K 2370/39* (2019.05); *G02B 2027/015* (2013.01); *G02B 2027/0127* (2013.01); *G02B 2027/0145* (2013.01)

(58) Field of Classification Search
CPC ............ G02B 27/0172; G02B 27/0149; G02B 27/145; G02B 27/0103; G02B 26/001; G02B 27/0101; G02B 27/017; G02F 1/03; A01B 69/001; G09G 3/003; G09G 2360/144; B43L 13/18; H04N 7/18; B82Y 20/00; B60R 1/00; G06T 19/00; G06T 19/006
USPC ... 359/629–636, 618, 639, 13–14, 237, 245, 359/247; 345/7–9, 632, 633, 207; 348/113–120; 349/11
See application file for complete search history.

(56) References Cited

U.S. PATENT DOCUMENTS

2017/0045738 A1    2/2017  Kim et al.
2017/0336628 A1*  11/2017  Kim .......................... G02B 5/30

FOREIGN PATENT DOCUMENTS

| JP | 2008-70504 A | 3/2008 |
|----|---|---|
| JP | 2013-214008 A | 10/2013 |
| JP | 2014-44244 A | 3/2014 |
| KR | 10-2011-0112558 A | 10/2011 |
| WO | WO 2015/125247 A1 | 8/2015 |
| WO | WO 2015/159523 A1 | 10/2015 |

\* cited by examiner

[FIG. 1]
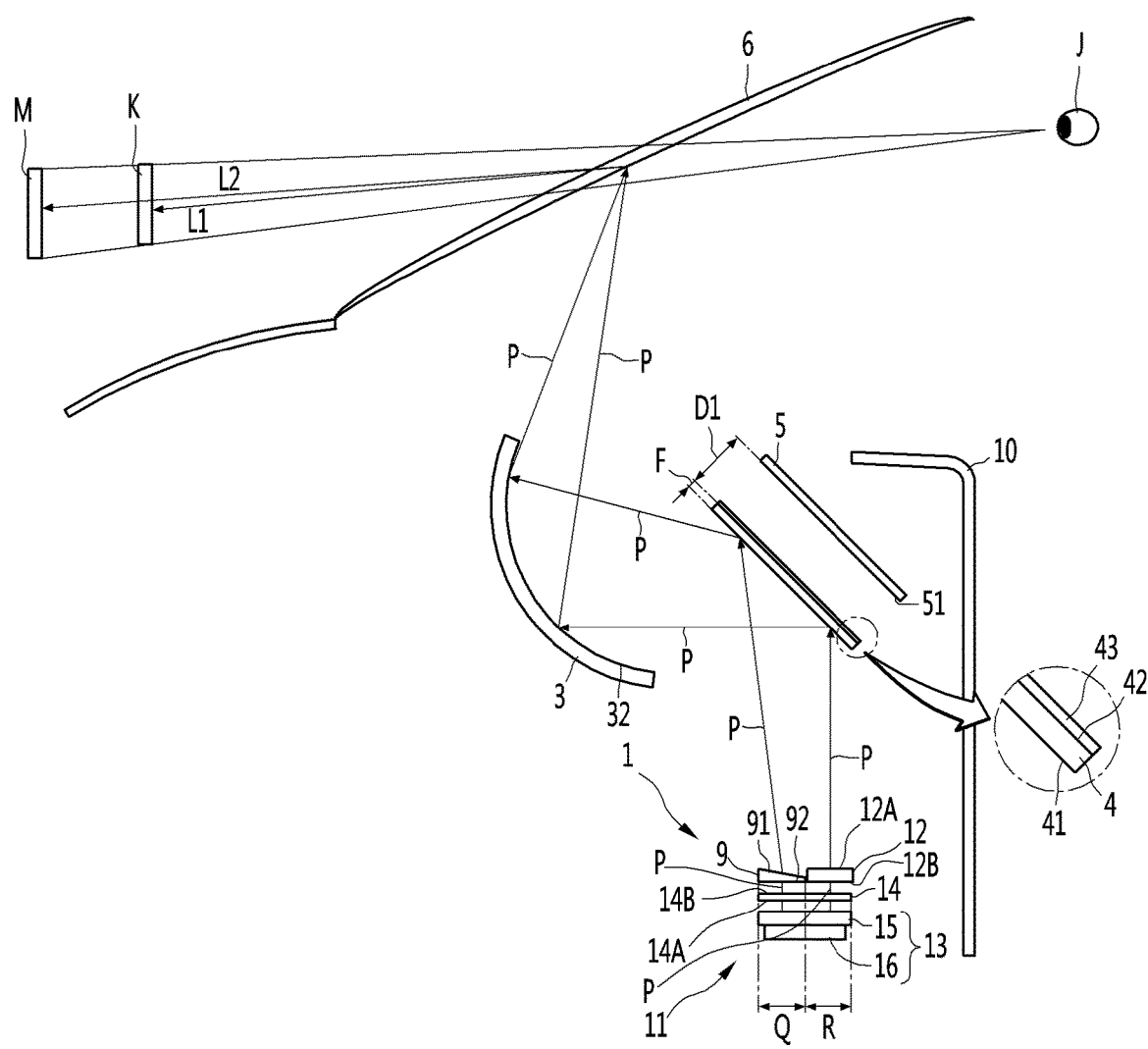

[FIG. 2]
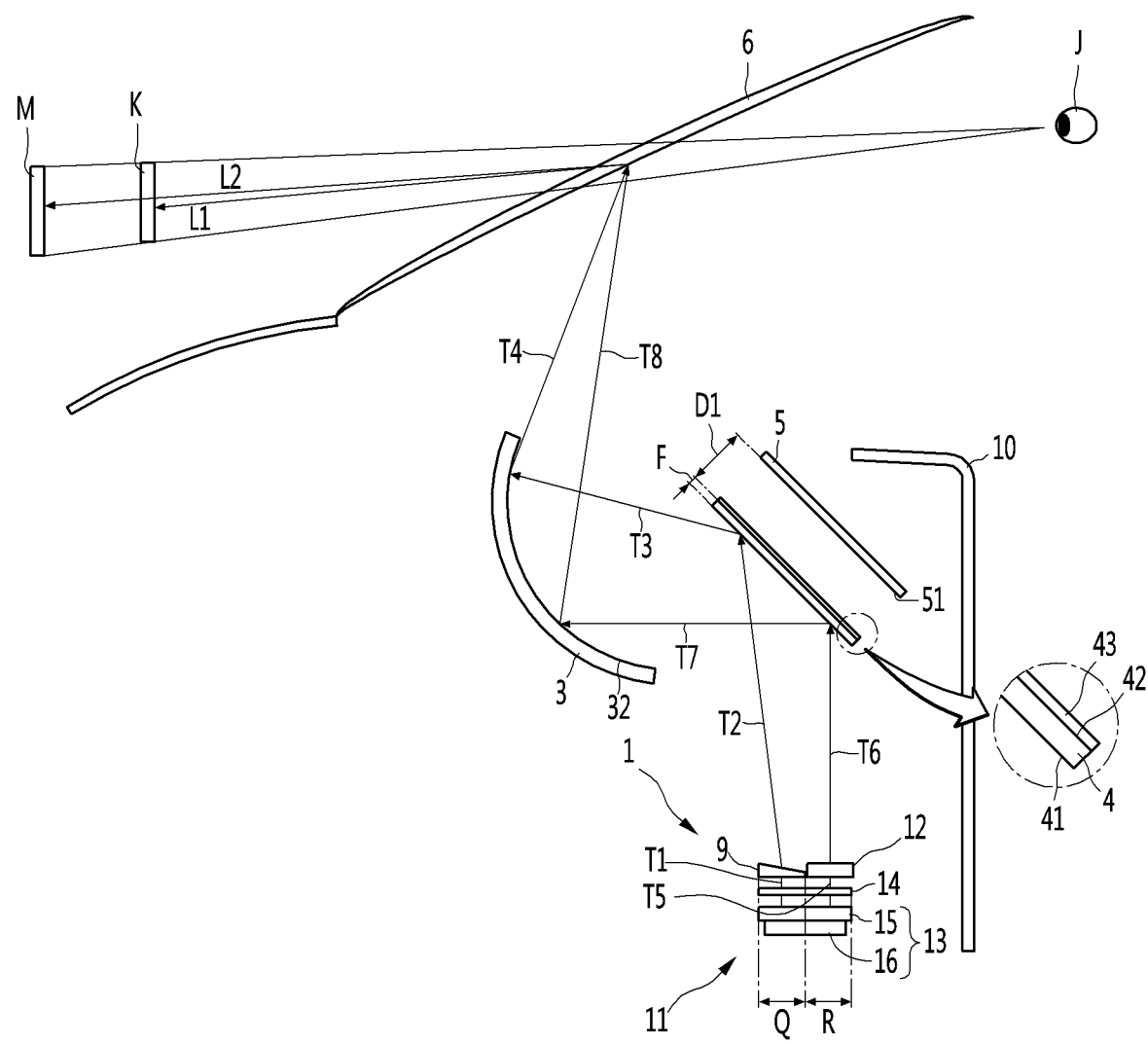

[FIG. 3]
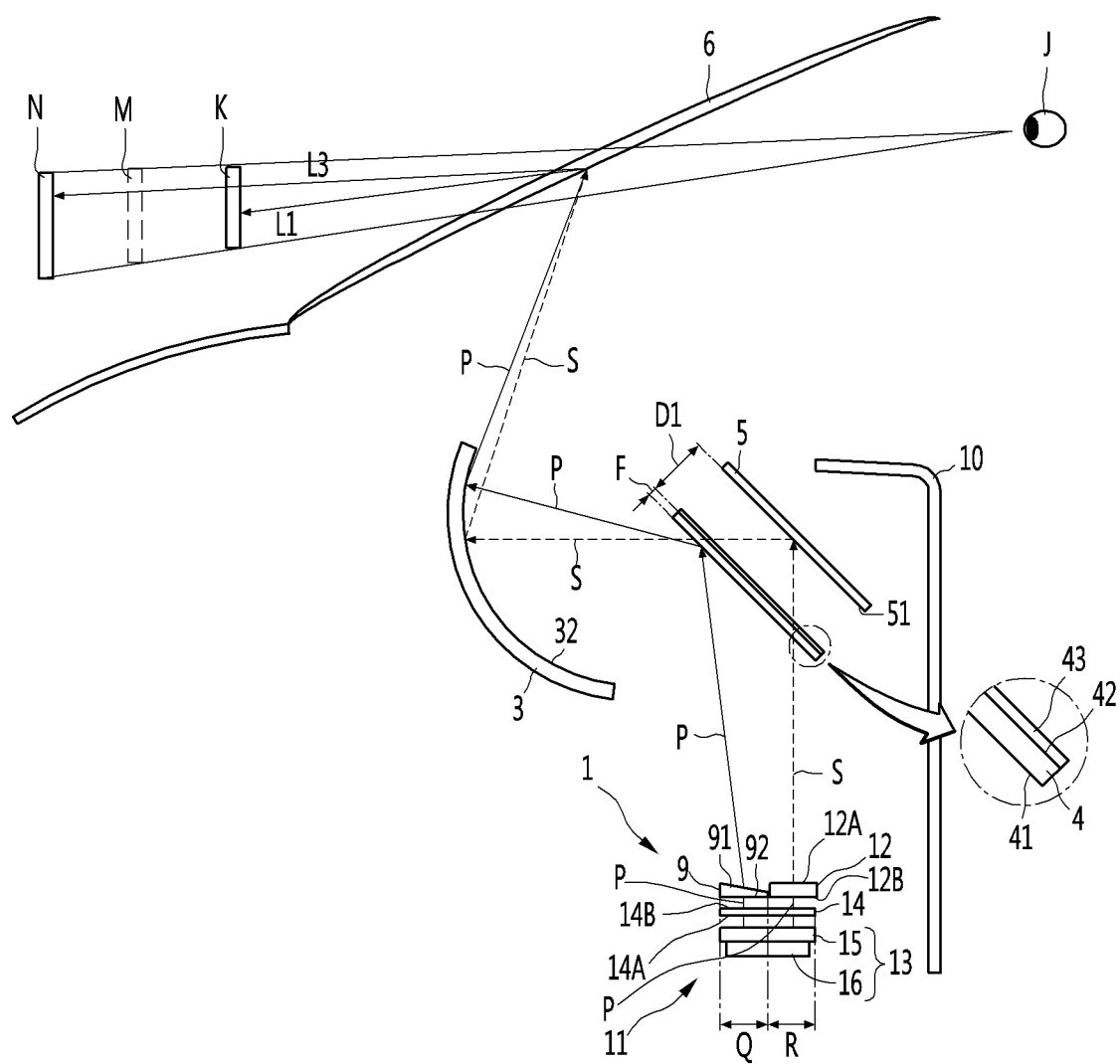

[FIG. 4]
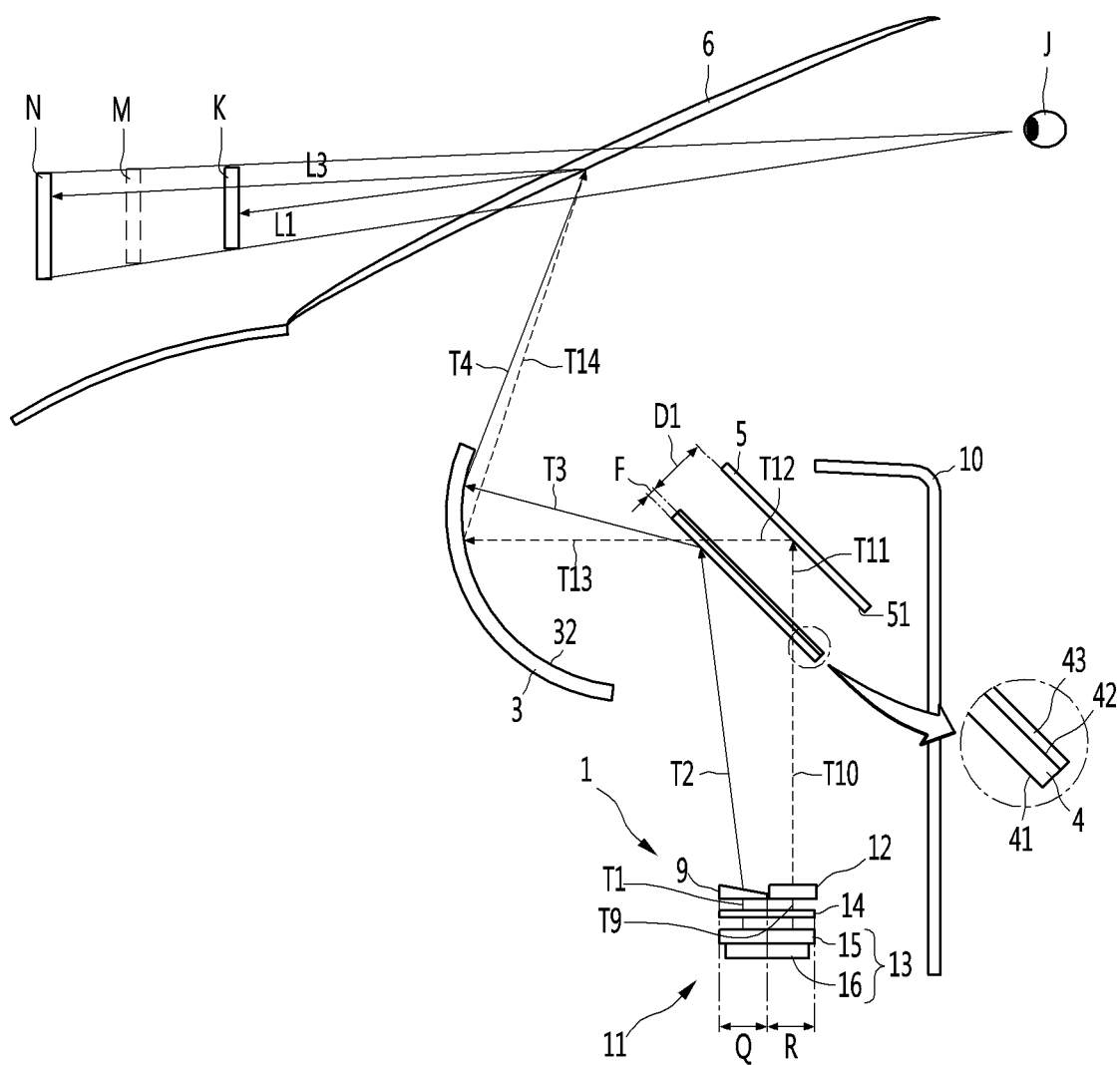

[FIG. 5]
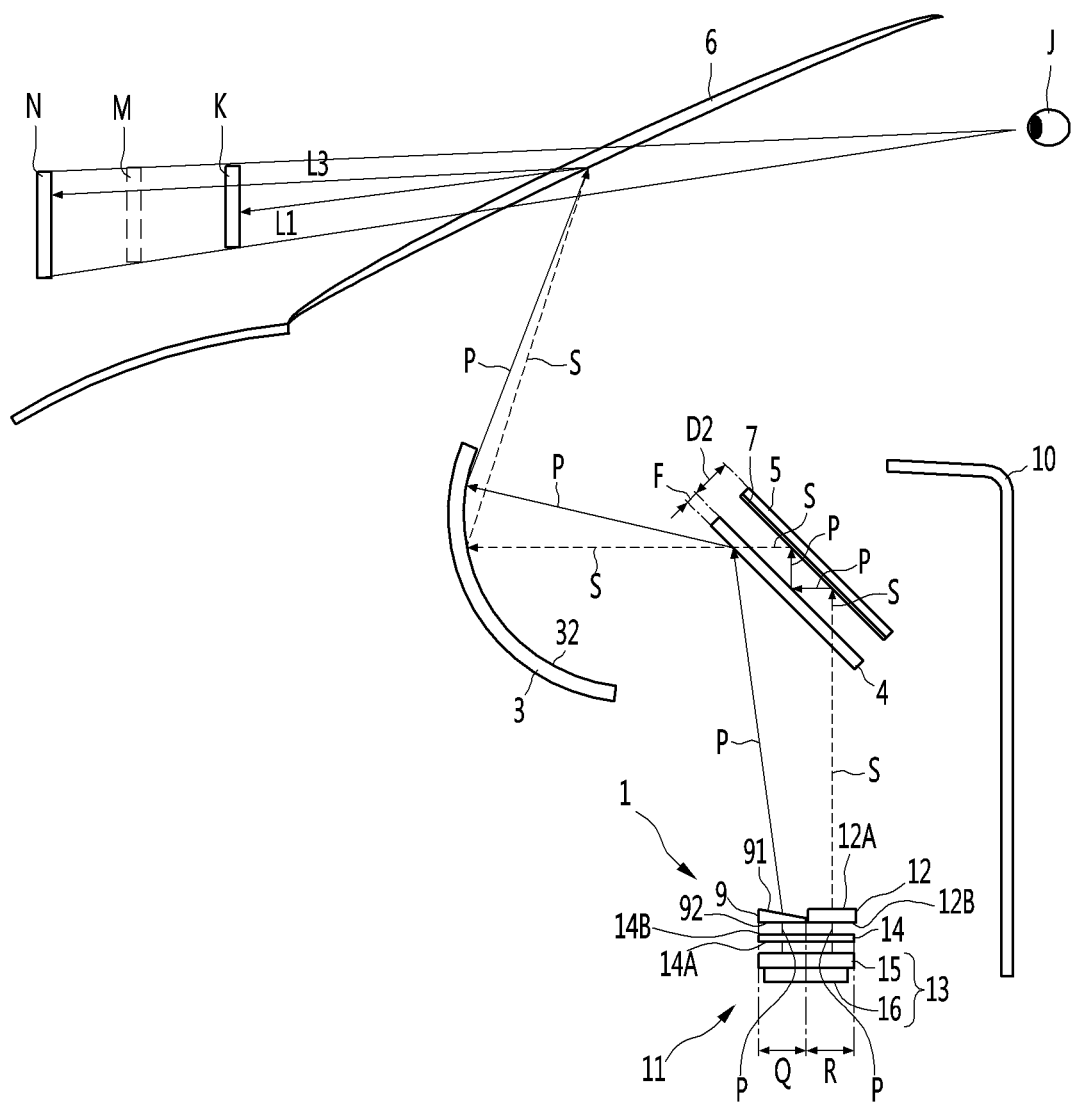

[FIG. 6]
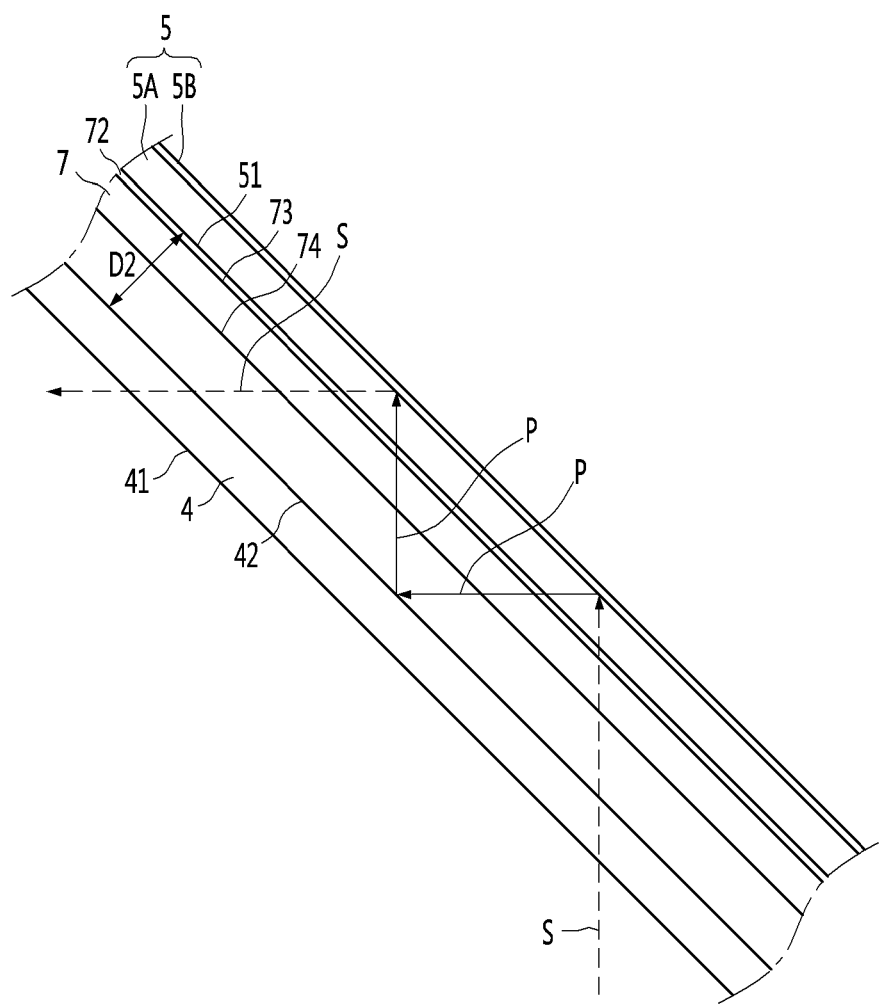

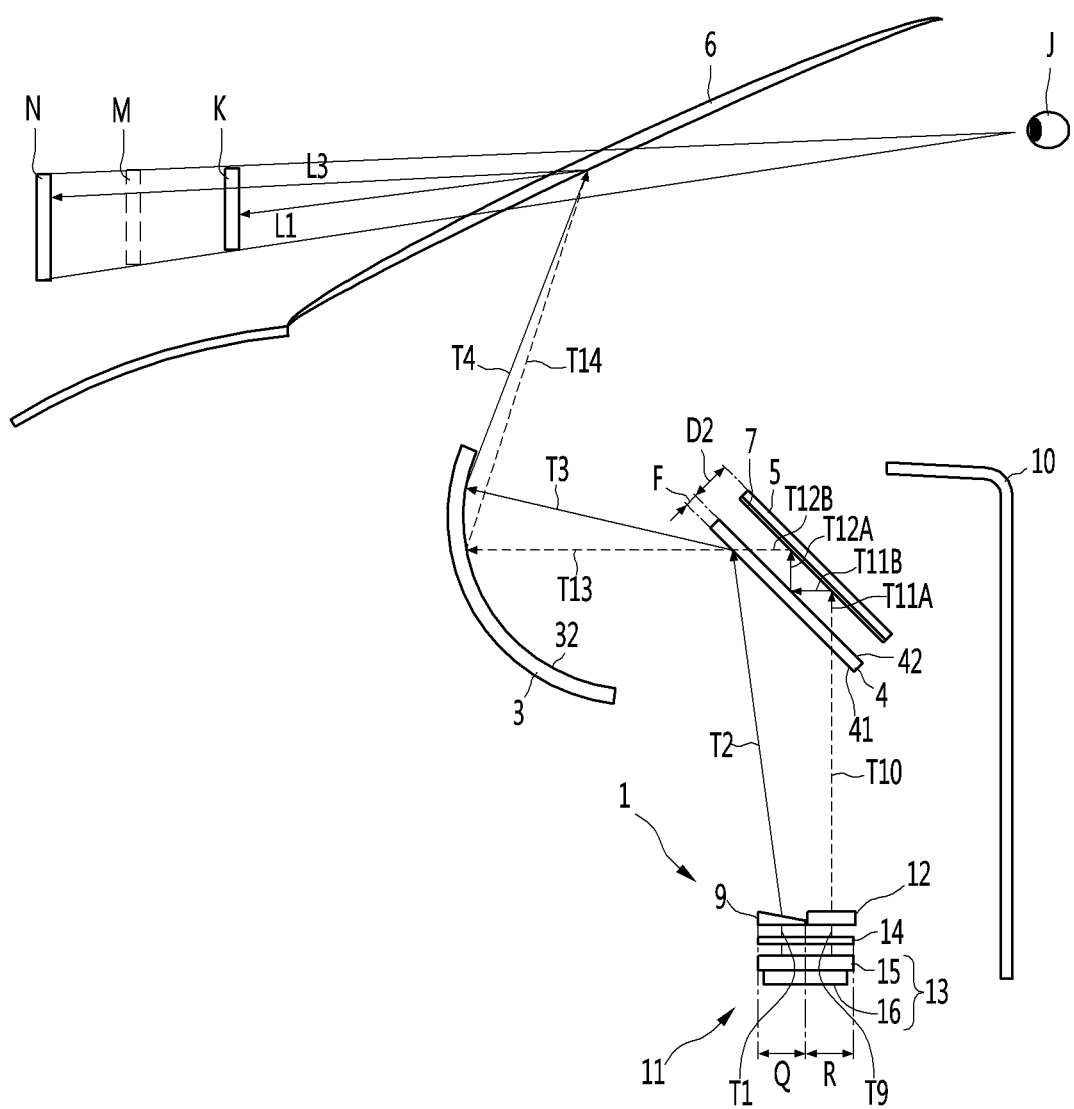
[FIG. 7]

[FIG. 8]
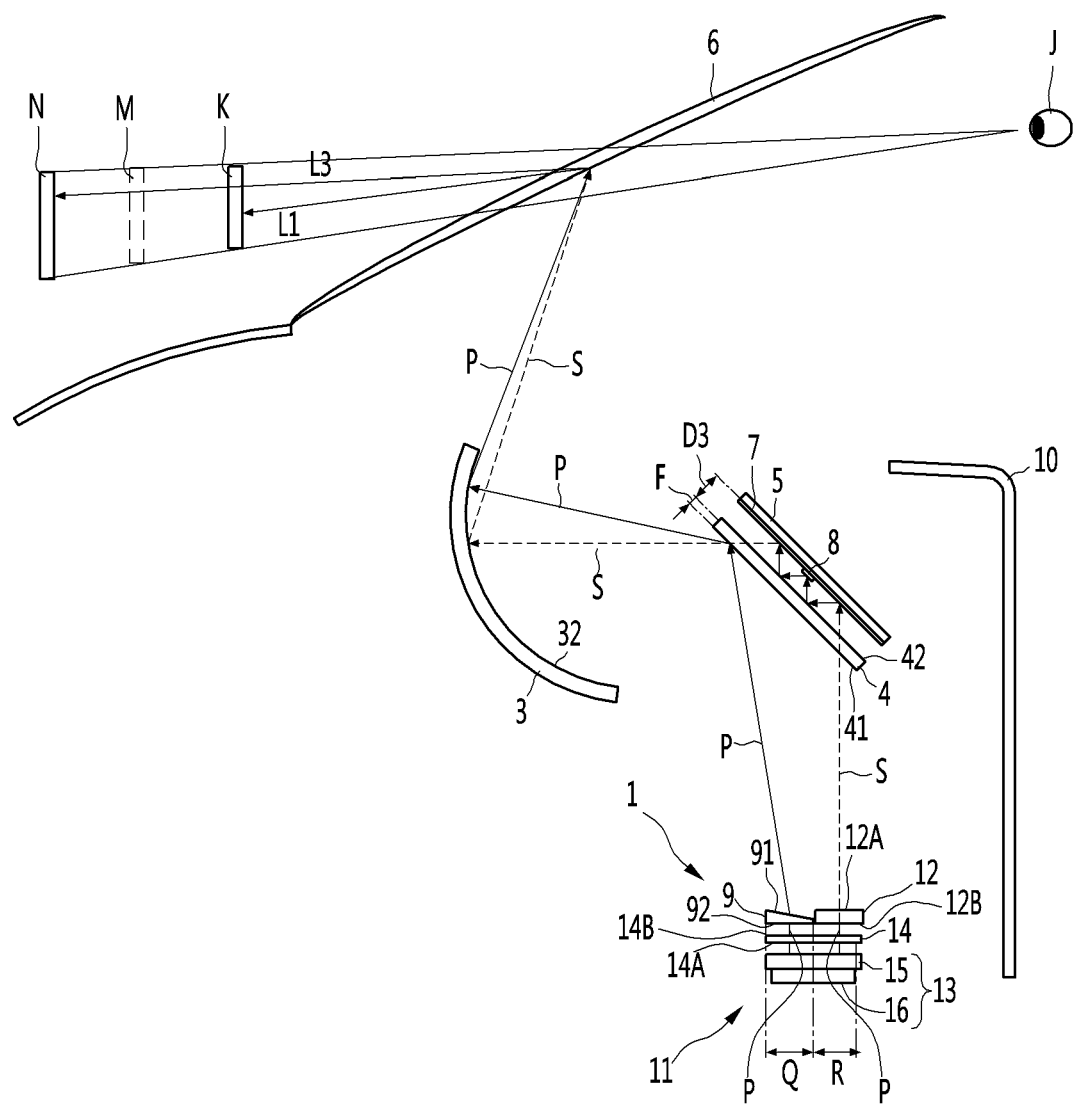

[FIG. 9]
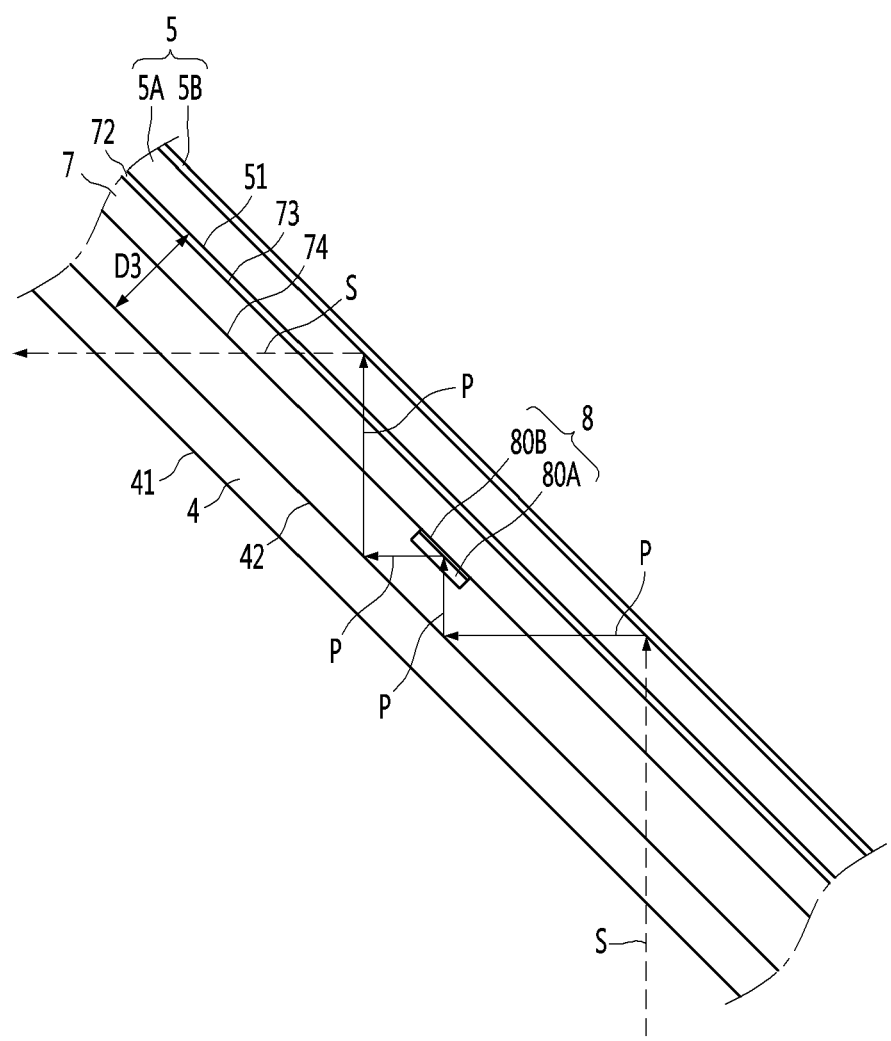

[FIG. 10]
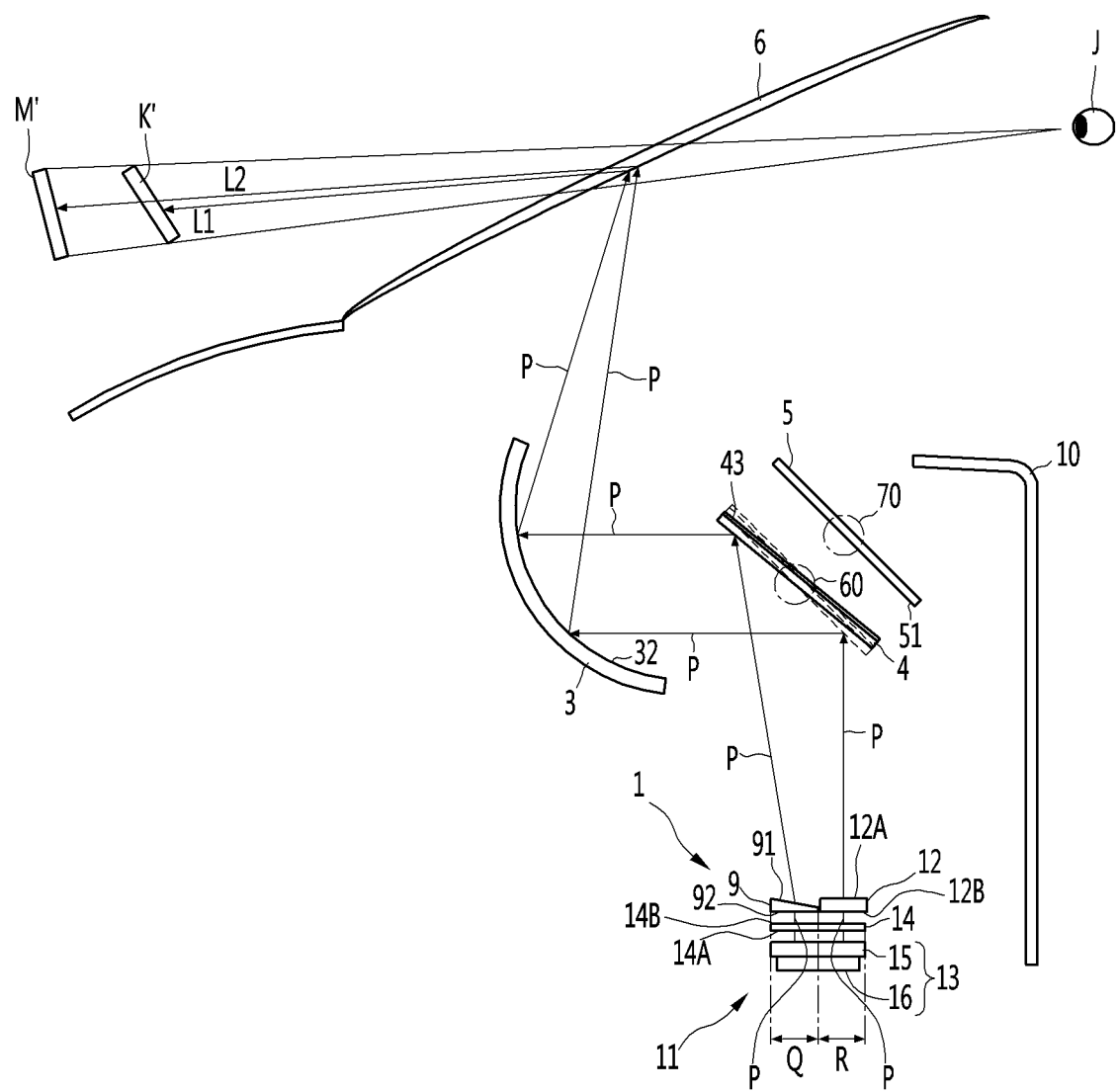

[FIG. 11]
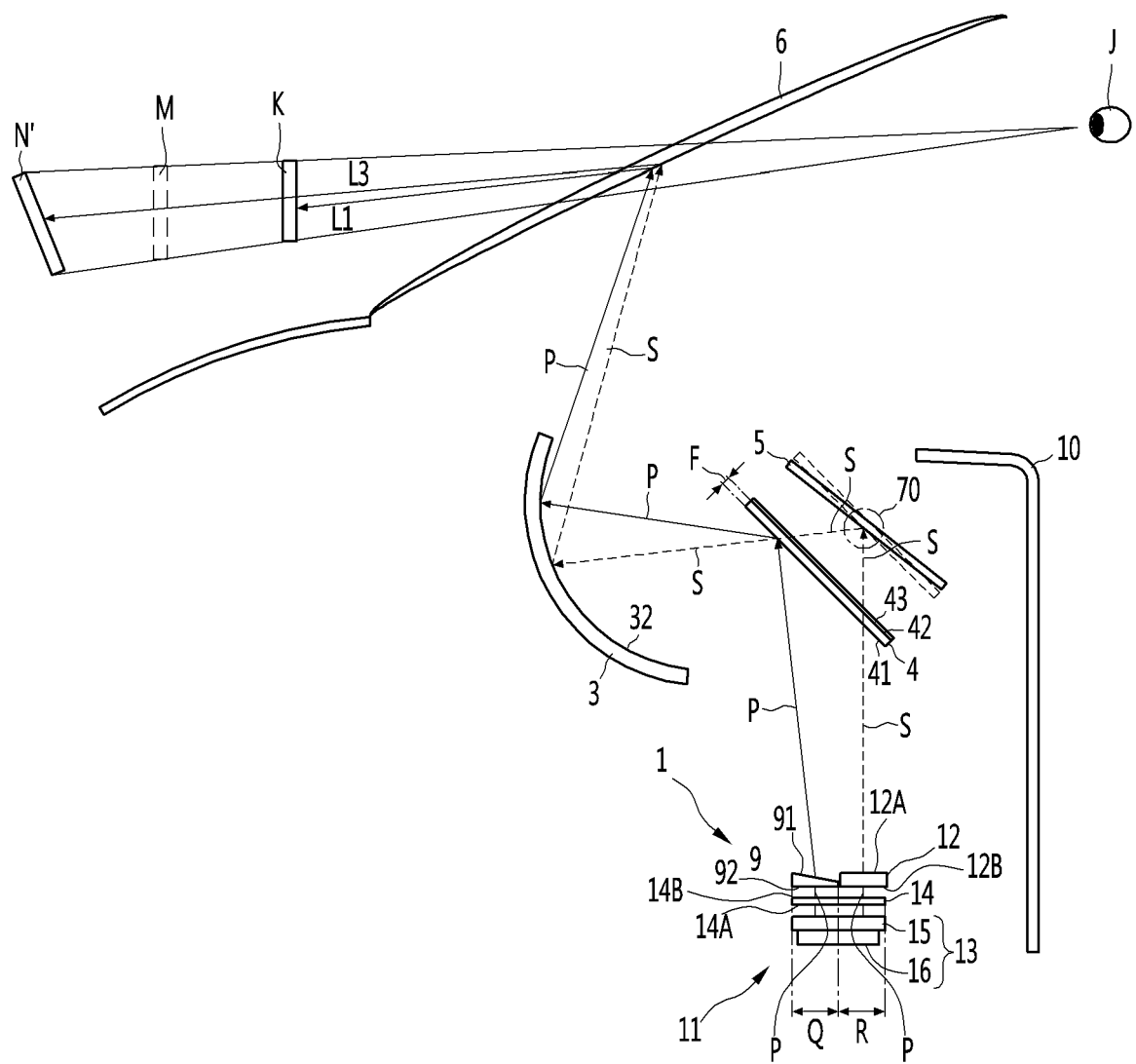

[FIG. 12]
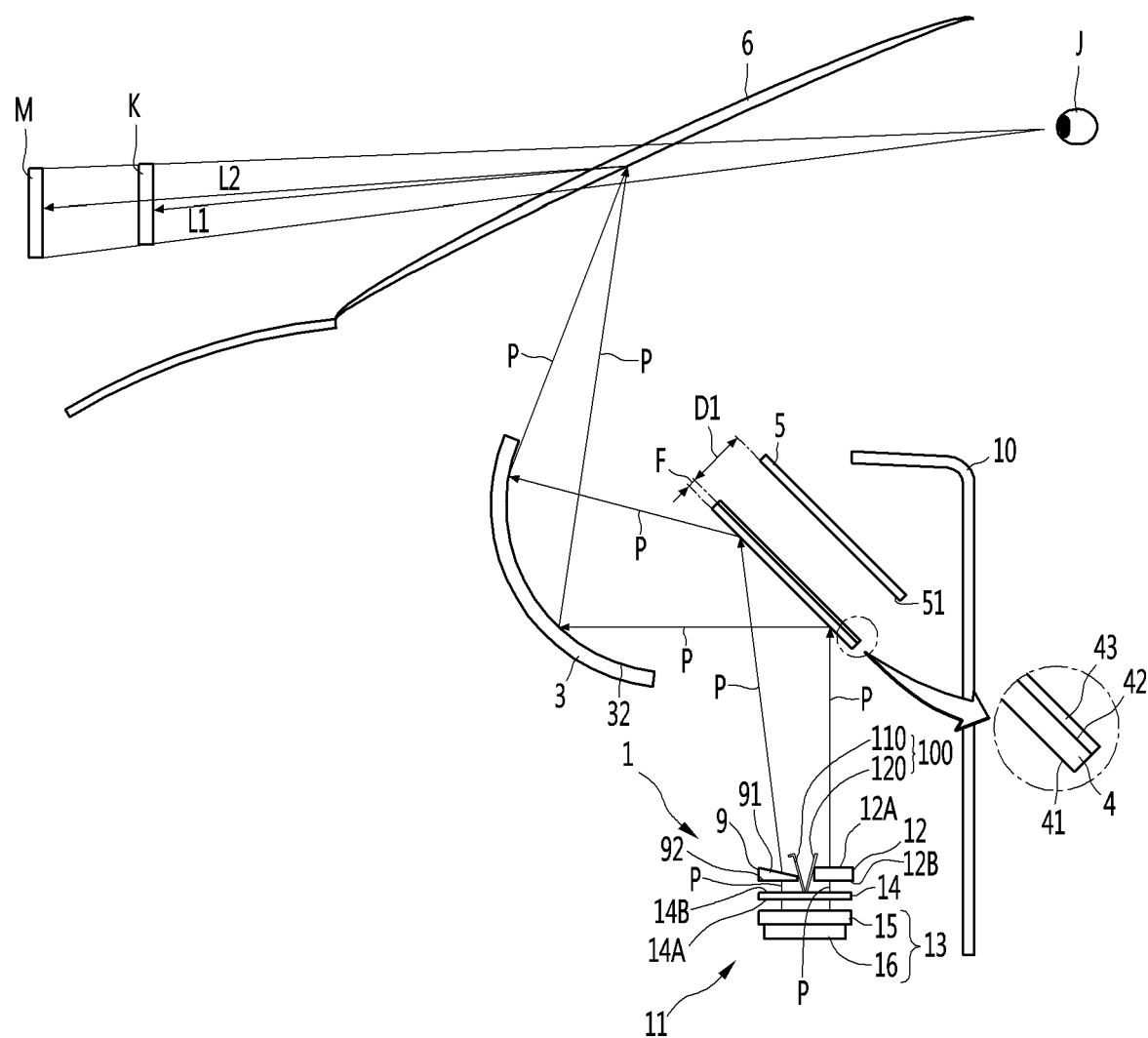

[FIG. 13]
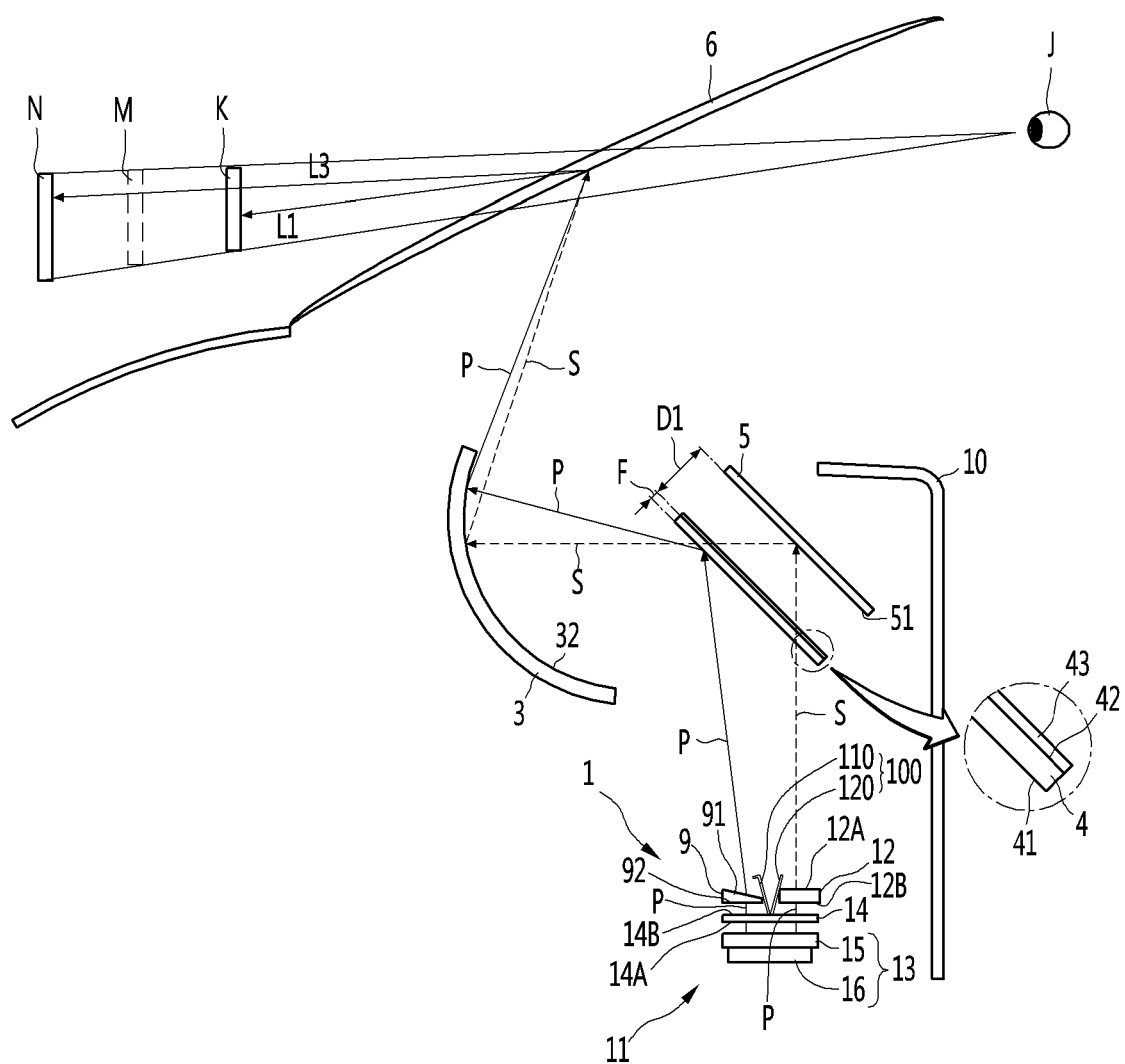

【FIG. 14】
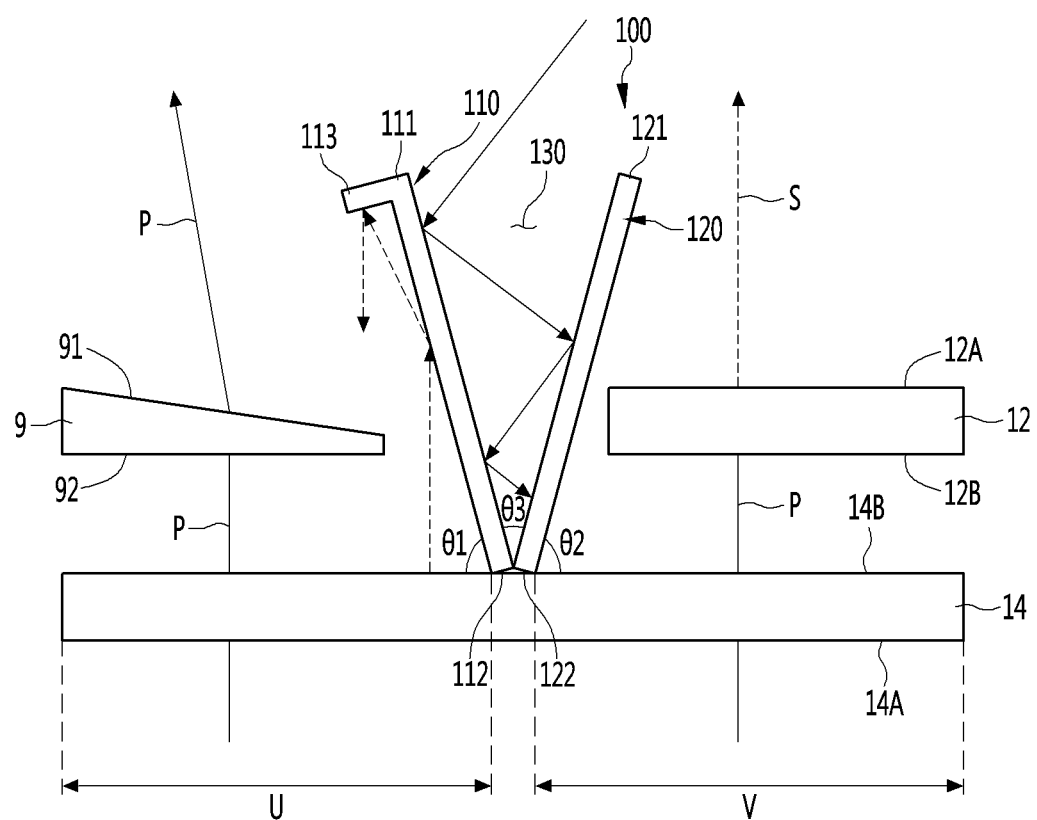

HEAD UP DISPLAY FOR VEHICLE

CROSS REFERENCE TO RELATED APPLICATIONS

This application is the National Phase of PCT International Application No. PCT/KR2017/006122, filed on Jun. 13, 2017, which claims priority under 35 U.S.C. 119(a) to Patent Application No. 10-2017-0024205, filed in the Republic of Korea on Feb. 23, 2017, all of these applications are hereby expressly incorporated by reference into the present application.

TECHNICAL FIELD

The present disclosure relates to a head up display for a vehicle, and more particularly to a head up display for a vehicle which may form a plurality of virtual images.

BACKGROUND ART

A head up display for a vehicle is included in the vehicle to emit an image light toward a windshield of the vehicle. The head up display for the vehicle may display various information including driving information while driving the vehicle.

The head up display for the vehicle includes a display panel that generates and outputs the image light and at least one mirror that reflects the image light generated from the display panel.

The image light generated from the display panel may be incident on a windshield of the vehicle by the mirror and a driver may recognize a virtual image in front of the windshield.

When the head up display for the vehicle includes two image sources, the head up display for the vehicle may form two virtual images. In this case, a convenience of the head up display for the vehicle may be increased.

KR 10-2015-0093353 A discloses a technology for forming two virtual images using two image sources. However, in this case, a structure is complicated, power consumption is increased, and an overall size is increased due to the two image sources, so that it is difficult to make it compact.

Further, the head-up display for the vehicle is able to form two virtual images by forming two optical paths respectively having total lengths different from each other even when the head-up vehicle includes one image source. As one example, US 2013/0265646 A1 (published Oct. 10, 2013) discloses a technology for forming two virtual images with one image source, one half mirror, and one or three flat mirrors. However, in this case, since the half mirror is used, optical loss is large. Further, since a number of flat mirrors are used to obtain a distance difference between the two virtual images, it is difficult to precisely set a distance between the virtual images due to interferences based on respective sizes of the one half mirror and the plurality of flat mirrors.

Further, US 2015/0061976 A1 (published Mar. 5, 2015) discloses a technology for forming two virtual images using one image source, a plurality of path mirrors, and a light baffle. However, since the plurality of flat mirrors arranged at different angles form an optical path for sequentially reflecting a light, the number of parts is large and a structure thereof is complicated.

Further, the prior art may not be able to control a spacing between the virtual images because virtual image distances are fixed, and the virtual image distance may not be systematically controlled based on an external traffic situation or the like of the vehicle.

DISCLOSURE

Technical Purpose

A purpose of the present disclosure is to provide a head up display for a vehicle that may generate a plurality of virtual images.

Another purpose of the present disclosure is to provide a head up display for a vehicle that may change a virtual image distance.

Still another purpose of the present disclosure is to provide a head up display for a vehicle that may be made compact while minimizing the number of parts using selective transmission/reflection of a light.

Technical Solution

In one aspect, there is provided a head up display for a vehicle including an image source for emitting a linearly-polarized light in a first direction, a prism for refracting a portion of the linearly-polarized light emitted from the image source, an electric polarization conversion element for transmitting the remaining portion of the linearly-polarized light emitted from the image source when the electric polarization conversion element is turned off and for half-wavelength converting the remaining portion of the linearly-polarized light emitted from the image source into a linearly-polarized light in a second direction orthogonal to the first direction when the electric polarization conversion element is turned on, a first reflection mirror for reflecting a light to a windshield of the vehicle, a polarization reflection mirror spaced apart from the first reflection mirror, wherein the polarization reflection mirror reflects the linearly-polarized light in the first direction and transmits the linearly-polarized light in the second direction, and a second reflection mirror spaced apart from the polarization reflection mirror, wherein the second reflection mirror reflects the light transmitted through the polarization reflection mirror to the polarization reflection mirror.

In one embodiment of the head up display for the vehicle, the image source may include a display panel for emitting an image light and a linear polarizer for linearly polarizing the image light emitted from the display panel in the first direction. The prism and the electric polarization conversion element may be smaller than the linear polarizer, respectively.

In one embodiment of the head up display for the vehicle, the prism and the electric polarization conversion element may face different regions of the linear polarizer, respectively.

In one embodiment of the head up display for the vehicle, the linear polarizer may include a first region facing the prism and a second region facing one face of the electric polarization conversion element.

In one embodiment of the head up display for the vehicle, the prism and the electric polarization conversion element may be arranged in a front and rear direction.

In one embodiment of the head up display for the vehicle, the prism may include a first face facing the polarization reflection mirror, wherein the first face is inclined and a second face facing the linear polarizer.

In one embodiment of the head up display for the vehicle, the prism and the electric polarization conversion element may be disposed between a light emitting face of the image source and one face of the polarization reflection mirror.

In one embodiment of the head up display for the vehicle, the polarization reflection mirror may be located above the prism and the electric polarization conversion element and behind the first reflection mirror.

In one embodiment of the head up display for the vehicle, the polarization reflection mirror may be a wire grid polarizer disposed behind the first reflection mirror, and the second reflection mirror may include a flat mirror disposed facing the polarization reflection mirror.

In one embodiment of the head up display for the vehicle, the polarization reflection mirror may be inclined such that one face thereof on which the linearly-polarized light emitted from the image source is incident faces a forward and downward direction, and the second reflection mirror may be inclined in the same direction as the polarization reflection mirror.

In one embodiment of the head up display for the vehicle, the polarization reflection mirror may be disposed to be inclined and disposed between the first reflection mirror and the second reflection mirror in a front and rear direction.

In one embodiment of the head up display for the vehicle, a separating partition disposed between the prism and the electric polarization conversion element may be further included.

In one embodiment of the head up display for the vehicle, the separating partition may include a first partition having a predetermined angle with a light emitting face of the image source and a second partition disposed to be more distant from the first partition as the second partition becomes more distant from the light emitting face of the image source.

In one embodiment of the head up display for the vehicle, a space facing between the first reflection mirror and the polarization reflection mirror may be defined between the first partition and the second partition.

In one embodiment of the head up display for the vehicle, an outwardly protruding protrusion may be formed on the first partition and/or the second partition.

Technical Effect

According to a preferred embodiment of the present disclosure, the polarization reflection mirror selectively transmits/reflects the linearly-polarized light, so that the head up display for the vehicle may be made compact or minimized in size compared to a case in which a light is simply reflected sequentially from a plurality of reflection mirrors.

Further, the linearly-polarized light in the first-direction emitted from the image source may form the three virtual images with different distances by five optical structures of the prism, the electric polarization conversion element, the polarization reflection mirror, the first reflection mirror, and the second reflection mirror. Therefore, the number of components for forming the three virtual images with the different distances may be minimized.

Further, resulting from turning on/off the electric polarization conversion element, the distance between two virtual images formed at the same time may be adjusted.

Further, the user may recognize as if the three virtual images are formed at the same time by sufficiently shortening the on/off period of the electric polarization conversion element, thereby providing more information to the user at the same time.

Further, the distance between the polarization reflection mirror and the second reflection mirror may be minimized by the retarder. Therefore, the head up display for the vehicle may become more compact.

Further, the retarder is attached to the front face of the second reflection mirror such that an installation of the retarder and the second reflection mirror may become easier and the head up display for the vehicle may become more compact than a case when the retarder and the second reflection mirror are spaced apart from each other.

Further, each of the virtual images may be formed to be tilted with a simple structure and a cubic effect may be enhanced.

Further, the lights respectively forming the virtual images may not be overlapped or interfered with each other by the separating partition and the image quality of each virtual image may be improved.

Further, the unnecessary peripheral image of each virtual image may be blocked by the separating partition.

Further, the external light or the like entering from the outside of the head up display for the vehicle is reflected by the separating partition such that the driver may be prevented from viewing the unnecessary image.

BRIEF DESCRIPTION OF THE DRAWINGS

FIG. 1 is a side view illustrating main components when an electric polarization conversion element of a head-up display for a vehicle according to a first embodiment of the present disclosure is turned off.

FIG. 2 is a side view illustrating an optical path when an electric polarization conversion element of a head up display for a vehicle according to a first embodiment of the present disclosure is turned off.

FIG. 3 is a side view illustrating main components of an electric polarization conversion element of a head up display for a vehicle according to a first embodiment of the present disclosure is turned on.

FIG. 4 is a side view of illustrating an optical path when an electric polarization conversion element of a head up display for a vehicle according to a first embodiment of the present disclosure is turned on.

FIG. 5 is a side view illustrating main components when an electric polarization conversion element of a head-up display for a vehicle according to a second embodiment of the present disclosure is turned on.

FIG. 6 is an enlarged side view illustrating a quarter-wavelength retarder, a second reflection mirror, and a polarization reflection mirror illustrated in FIG. 5.

FIG. 7 is a side view illustrating an optical path when an electric polarization conversion element of a head up display for a vehicle according to a second embodiment of the present disclosure is turned on.

FIG. 8 is a side view illustrating main components when an electric polarization conversion element of a head-up display for a vehicle according to a third embodiment of the present disclosure is turned on.

FIG. 9 is an enlarged side view illustrating a quarter-wavelength retarder, a second reflection mirror, a polarization reflection mirror, and a third reflection mirror illustrated in FIG. 8.

FIG. 10 is a side view in which a first virtual image and a second virtual image are inclined when a polarization reflection mirror of a head up display for a vehicle according to a fourth embodiment of the present disclosure rotates.

FIG. 11 is a side view in which a third virtual image is inclined when a second reflection mirror of a head up display for a vehicle according to a fourth embodiment of the present disclosure rotates.

FIG. 12 is a side view illustrating main components when an electric polarization conversion element of a head-up display for a vehicle according to a fifth embodiment of the present disclosure is turned off.

FIG. 13 is a side view illustrating main components when an electric polarization conversion element of a head-up display for a vehicle according to a fifth embodiment of the present disclosure is turned on.

FIG. 14 is an enlarged side view illustrating a linear polarizer, a prism, an electric polarization conversion element, and a separating partition illustrated in FIG. 13.

DETAILED DESCRIPTIONS

Hereinafter, specific embodiments of the present disclosure will be described in detail with reference to drawings.

A vertical direction described herein may include not only a vertical direction but also a vertical direction inclined rearwardly in a certain angle and a vertical direction forwardly inclined in a certain angle. Further, a front and rear direction described herein may include not only a horizontal direction but also a front and rear direction inclined upwardly in a certain angle and a front and rear direction inclined downwardly in a certain angle.

FIG. 1 is a side view illustrating main components when an electric polarization conversion element of a head-up display for a vehicle according to a first embodiment of the present disclosure is turned off. Further, FIG. 2 is a side view illustrating an optical path when an electric polarization conversion element of a head up display for a vehicle according to a first embodiment of the present disclosure is turned off. Further, FIG. 3 is a side view illustrating main components of an electric polarization conversion element of a head up display for a vehicle according to a first embodiment of the present disclosure is turned on. Further, FIG. 4 is a side view of illustrating an optical path when an electric polarization conversion element of a head up display for a vehicle according to a first embodiment of the present disclosure is turned on.

Referring to FIGS. 1 to 4, a head up display for a vehicle according to the present embodiment may include an imaging mechanism 1, a first reflection mirror 3, a polarization reflection mirror 4, and a second reflection mirror 5.

The head up display for the vehicle may emit an image light towards a windshield 6 of the vehicle. The windshield 6 may be a window that is positioned to face a forward direction of the vehicle. A driver may look at an object in front of the vehicle through the windshield 6. The driver may look at virtual images K, M, and N in front of the windshield 6 via the head up display.

The head up display for the vehicle may be accommodated in or put on an instrument panel 10 in front of a driver's seat of the vehicle and may irradiate the image light in an upward direction.

The imaging mechanism 1 may emit a linearly-polarized light in a first direction and a linearly-polarized light in a second direction that is orthogonal to the first direction.

The imaging mechanism 1 includes an image source 11, a prism 9, and an electric polarization conversion element 12.

The image source 11 may emit the linearly-polarized light in the first direction.

The prism 9 may refract the linearly-polarized light emitted from the image source 11.

When the electric polarization conversion element 12 is turned on, the electric polarization conversion element 12 may half-wavelength convert the linearly-polarized light in the first direction emitted from the image source 11 into the linearly-polarized light in the second direction. When the electric polarization conversion element 12 is turned off, the electric polarization conversion element 12 may transmit the linearly-polarized light in the first direction.

The image source 11 may include a display panel 13 for emitting the image light and a linear polarizer 14 for linearly polarizing the image light emitted from the display panel 13 in the first direction.

The display panel 13 may include a display element 15; and a light source 16 that illuminates a light to the display element 15.

The display panel 13 may emit the image light towards the linear polarizer 14. The display panel 13 is an image generating unit. The display panel 13 may be a display device capable of generating the image light by controlling an electric signal, such as an LCD (liquid crystal display) panel, an LED (light emitting diode) panel, or an OLED (organic light emitting diode) panel, and the like.

The light source 16 may be a backlight unit (BLU) which may emit the light toward the display element 15. The light source 16 may be an LED, an OLED, or the like.

The linear polarizer 14 may pass only the linearly-polarized light in the first direction out of the image lights emitted from the display panel 13. A non-polarized light may be emitted from the display panel 13. The non-polarized light may be polarized in the first direction at the linear polarizer 14. A P-wave linearly-polarized light P or a S-wave linearly-polarized light S may be emitted from the linear polarizer 14.

The linear polarizer 14 may be disposed within the display element 15. In this case, a linearly-polarized light polarized by the linear polarizer 14 may be emitted from the display element 15.

The linear polarizer 14 may be disposed outside the display element 15. In this case, a non-polarized light emitted from the display element 15 may be incident on the linear polarizer 14 and a linear polarized light polarized in the first direction may be emitted from the linear polarizer 14.

When the linear polarizer 14 is disposed outside the display element 15, one face 14A of the linear polarizer 14 may be disposed to face the display element 15 and the other face 14B of the linear polarizer 14 may be disposed to face the polarization reflection mirror 4.

In the linear polarizer 14, said one face 14A facing the display panel 13 may be a light incidence face on which the light is incident and the other face 14B may be a light emitting face.

The linear polarizer 14 may be disposed to cover a light emitting face of the display element 15.

When the display panel 13 emits the non-polarized light in the upward direction, the linear polarizer 14 may be disposed above the display panel 15.

When the display panel 13 emits the non-polarized light in the downward direction, the linear polarizer 14 may be disposed below the display panel 15.

The prism 9 may refract a portion of the linearly-polarized light in the first direction emitted from the image source 11.

The prism 9 and the electric polarization conversion element 12 may be arranged in a front and rear direction.

The prism 9 may be disposed vertically away from the polarization reflection mirror 4.

The prism 9 may emit light in a direction in which the linearly-polarized light in the first direction becomes more distant from the linearly-polarized light emitted from the electric polarization conversion element 12.

The prism 9 may include a first face 91 formed to be inclined and a second face 92 formed to be flat. The first face 91 may be a light emitting face of the prism 9 and the second face 92 may be a light incidence face of the prism 9.

The first face 91 may be formed to be inclined in the same direction as one face 41 of the polarization reflection mirror 4. The first face 91 may be directed to said one face 41 of the polarization reflection mirror 4.

The second face 92 may face the light emitting face 14B of the linear polarizer 14.

The prism 9 may be disposed between the light emitting face of the image source 11 and said one face 41 of the polarization reflection mirror 4. When the image source 11 includes the linear polarizer 14, the light emitting face 14B of the linear polarizer 14 may be a light emitting face of the image source 11.

The prism 9 may be smaller than the linear polarizer 14. The prism 9 may be smaller than the light emitting face 14B of the linear polarizer 14.

Further, the prism 9 may face some regions of the linear polarizer 14. The prism 9 may face only some regions of the light emitting faces 14B of the linear polarizer 14. It is preferable that the prism 9 does not face other regions of the light emitting face 14B of the linear polarizer 14.

A portion of the linearly-polarized light emitted from the linear polarizer 14 is incident on and refracted by the prism 9. The remaining portion of the linearly-polarized light emitted from the linear polarizer 14 may be incident on and half-wavelength converted by the electric polarization conversion element retarder 12.

One face 12B of the electric polarization conversion element 12 may face the light emitting face 14B of the linear polarizer 14.

The other face 12A of the electric polarization conversion element 12 may be directed to said one face 41 of the polarization reflection mirror 4.

The electric polarization conversion element 12 may include a polarizing switch or an active retarder that changes a wavelength of input linearly-polarized light by 90 degrees by applying a voltage that changes an optical phase difference between two linearly-polarized lights, which are orthogonal to an electro-optic crystal by $\pi$ radians, that is a half-wavelength voltage.

This electric polarization conversion element 12 may be a half-wavelength retarder (Half Wave Plate: HWP) 15 that changes the wavelength of the input linearly-polarized light by 90 degrees when the half-wavelength voltage is applied.

The electric polarization conversion element 12 may turn on/off an operation of the half-wavelength retarder (half wave plate) based on the applied voltage.

When the half-wavelength voltage is not applied to the electric polarization conversion element 12, the linearly-polarized light input to the incident face 12B thereof may be transmitted without the wavelength conversion.

When the half-wavelength voltage is applied to the electric polarization conversion element 12, the electric polarization conversion element 12 may half-wavelength convert the linearly-polarized light input to the incident face 12B thereof and emit the half-wavelength wavelength converted light.

For example, when the electric polarization conversion element 12 is turned off, and when the P-wave linearly-polarized light is emitted from the image source 11, the P-wave linearly-polarized light emitted from the image source 11 may transmit the electric polarization conversion element 12 without the wavelength conversion and the P-wave linearly-polarized light transmitted through the electric polarization conversion element 16 without the wavelength conversion may be incident on one face of the polarization reflection mirror 4.

On the other hand, when the electric polarization conversion element 12 is turned on and when the P-wave linearly-polarized light is emitted from the image source 11, the P-wave linearly-polarized light emitted from the image source 11 may be half-wavelength converted while transmitting through the electric polarization conversion element 12, the S-wave linearly-polarized light may be emitted from the electric polarization conversion element 12, and the S-wave linearly-polarized light emitted from the electric polarization conversion element 16 may be incident on said one face of the polarization reflection mirror 4.

Based on turn-off time and turn-on time, the electric polarization conversion element 12 may determine time when the linearly-polarized light in the first direction to be emitted to the polarization reflection mirror 4 is emitted to the polarization reflection mirror 4 and time when the linearly-polarized light in the second direction to be emitted to the polarization reflection mirror 4 is emitted to the polarization reflection mirror 4.

The electric polarization conversion element 12 may be disposed between the light emitting face of the image source 11 and said one face 41 of the polarization reflection mirror 4. When the image source 11 includes the linear polarizer 14, the light emitting face 14B of the linear polarizer 14 may be the light emitting face of the image source 11.

A portion of the linearly-polarized light in the first direction emitted from the image source 11 may be incident on the prism 9, while others may be incident on the electric polarization conversion element 12.

When the electric polarization conversion element 12 is turned on, the electric polarization conversion element 12 may half-wavelength convert a portion of the linearly-polarized light of the first direction emitted from the image source 11 into the linearly-polarized light of the second direction. When the electric polarization conversion element 12 is turned off, the electric polarization conversion element 12 may transmit a portion of the linearly-polarized light of the first direction emitted from the image source 11.

The electric polarization conversion element 12 may be smaller than the linear polarizer 14. The electric polarization conversion element 12 may be smaller than the light emitting face 14B of the linear polarizer 14.

Further, the electric polarization conversion element 12 may face some regions of the linear polarizer 14. The electric polarization conversion element 12 may face only some regions of the light emitting faces 14B of the linear polarizer 14. It is preferable that the electric polarization conversion element 12 does not face other regions of the light emitting face 14B of the linear polarizer 14.

A portion of the linearly-polarized light emitted from the linear polarizer 14 is incident on the electric polarization conversion element 12 and is half-wavelength converted by the electric polarization conversion element 12. The remaining portion of the linearly-polarized light emitted from the linear polarizer 14 may not be incident on the electric polarization conversion element 12 but may be directed to the prism 9.

The linear polarizer 14 may have a first region Q facing the prism 9 and a second region R facing the electric polarization conversion element 12.

A linearly-polarized light of the first direction emitted from the first region Q of the linear polarizer 14 may be incident on the prism 9, retracted through the prism 9, and then emitted toward the polarization reflection mirror 4.

On the other hand, the linearly-polarized light of the first direction emitted from the second region R of the linear polarizer 14 may be incident on the electric polarization conversion element 12. In this connection, when the electric polarization conversion element 12 is turned off, the linearly-polarized light in the first direction emitted from the second region R may be transmitted. When the electric polarization conversion element 12 is turned-on, the linearly polarized light in the first direction emitted from the second region R may be half-wavelength converted into the linearly-polarized light in the second direction. The linearly-polarized light transmitted through the electric polarization conversion element 12 may be emitted towards the polarization reflection mirror 4.

For example, when the P-wave linearly-polarized light P is emitted from both the first region Q and the second region R of the linear polarizer 14, a P-wave linearly-polarized light P emitted from the first region Q of this P-wave linearly-polarized light P may be refracted through the prism 9 without being converted in a wavelength thereof and then directed to the polarization reflection mirror 4.

Further, a P-wave linearly-polarized light P emitted from the second region R of this P-wave linearly-polarized light P may be directed to the polarization reflection mirror 4 in a state of the P-wave linearly-polarized light P without being converted in a wavelength thereof when the electric polarization conversion element 12 is turned off, or may be converted into the S-wave linearly-polarized light S at the electric polarization conversion element 12 and directed to the polarization reflection mirror 4 when the electric polarization conversion element 12 is turned on.

The first reflection mirror 3 may reflect the light to the vehicle's windshield 6.

The first reflection mirror 3 may reflect the light reflected from the polarization reflection mirror 4 or the light transmitted through the polarization reflection mirror 4 toward the windshield 6.

The first reflection mirror 3 may be positioned in front of the polarization reflection mirror 4. A reflection face 32 of the first reflection mirror 3 may face the front face 41 of the polarization reflection mirror 4 in the front and rear direction. The first reflection mirror 3 may be a concave mirror.

The first reflection mirror 3 may be disposed to be inclined at a predetermined angle and may reflect the light reflected from the polarization reflection mirror 4 or transmitted through the polarization reflection mirror 4 in an upward direction.

The polarization reflection mirror 4 may be a beam splitter that reflects a linearly-polarized light in the same direction as the linearly-polarized light emitted from the image source 11 and transmits a linearly-polarized light perpendicular to the linearly-polarized light emitted from image source 11.

The polarization reflection mirror 4 may be formed in a plate shape. One face 41 and the other face 42 of the polarization reflection mirror 4 may respectively refer to a pair of relatively wide faces facing each other of an outer face of the polarization reflection mirror 4.

Said one face 41 of the polarization reflection mirror 4 may disposed to face a front direction and the other face 42 may be disposed to face a rear direction.

The linearly-polarized light of the first direction incident on the polarization reflection mirror 4 may be reflected on said one face 41 and the other face 42 of the polarization reflection mirror 4. Further, the linearly-polarized light of the second direction incident on the polarization reflection mirror 4 may be transmitted through said one face 41 and the other face 42 of the polarization reflection mirror 4.

The polarization reflection mirror 4 may be spaced apart from the first reflection mirror 3 behind the first reflection mirror 3. The polarization reflection mirror 4 may be a selective polarization element that reflects the linearly-polarized light in the first direction and transmits the linearly-polarized light in the second direction. The polarization reflection mirror 4 may preferably be a wire grid polarizer (WGP) disposed behind the first reflection mirror 3. The wire grid polarizer reflects a linearly-polarized light in a direction perpendicular to a polarization transmission axis thereof and transmits a linearly-polarized light in a direction matches the polarization transmission axis thereof.

The polarization reflection mirror 4, the wire grid polarizer, may maintain a brightness of the light between the first and second reflection mirrors 3 and 5 and may maintain its selective transmission/reflection performance while receiving, at a wide incident angle, lights respectively incident from the prism 9, the electric polarization conversion element 12, and the second reflection mirror 5.

When the linearly-polarized light of the first direction is the P-wave linearly-polarized light P, the polarization reflection mirror 4 may reflect the P-wave linearly-polarized light P and transmit the S-wave linearly-polarized light S. Conversely, when the linearly-polarized light of the first direction is the S-wave linearly-polarized light, the polarization reflection mirror 4 may reflect the S-wave linearly-polarized light S and transmit the P-wave linearly-polarized light.

The polarization reflection mirror 4 and the prism 9 may be located above the electric polarization conversion element 12. Further, the polarization reflection mirror 4 may be disposed behind the first reflection mirror 3.

The polarization reflection mirror 4 may reflect the linearly-polarized light in the first direction emitted from the prism 9 to the first reflection mirror 3. The polarization reflection mirror 4 may reflect the linearly-polarized light in the first direction emitted from the turn-off-state electric polarization conversion element 12 to the first reflection mirror 3. The polarization reflection mirror 4 may transmit the linearly-polarized light in the second direction emitted from the turn-on-state electric polarization conversion element 12.

The linearly-polarized light in the second direction transmitted through the polarization reflection mirror 4 may be incident on the second reflection mirror 5 and reflected from the second reflection mirror 5 toward the rear face 42 of the polarization reflection mirror 4. Further, the linearly-polarized light in the second direction reflected toward the rear face 42 of the polarization reflection mirror 4 may be transmitted through the polarization reflection mirror 4 and directed to the first reflection mirror 3 through the front face 41 of the polarization reflection mirror 4.

The polarization reflection mirror 4, which is the selective polarization element, may implement two virtual images while minimizing a loss of light compared to that of a half mirror and may lower a brightness of the image source 11 because the loss of light is small. Further, the polarization reflection mirror 4 may reduce a power consumption of the image source 11 and may reduce a size of a heat dissipating unit (not shown) that dissipates heat of the image source 11 or may simplify a structure of the heat dissipating unit.

For front reflection of the linearly-polarized light in the first direction and front transmission of the linearly-polarized light in the second direction, the polarization reflection mirror 4 may be disposed between the first reflection mirror 3 and the second reflection mirror 5, and may be disposed to be inclined between the first reflection mirror 3 and the second reflection mirror 5.

Because the polarization reflection mirror 4 selectively transmits/reflects the linearly-polarized light between two reflection mirrors 3 and 5, the present embodiment may minimize the number of multiple optical components to form the two virtual images and may compact the overall size of the head up display for the vehicle.

The polarization reflection mirror 4 may be inclined such that a front face 41 thereof faces a forward and downward direction. The polarization reflection mirror 4 may have the rear face 42 thereof facing a rearward and upward direction and the rear face 42 of the polarization reflection mirror 4 may face the front face 51 of the second reflection mirror 5.

The polarization reflection mirror 4 may further include an anti-reflection coated layer 43 formed on the face 42 facing the second reflection mirror 5 out of the both faces 41 and 42. In this connection, the anti-reflection coated layer 43 may reduce a surface reflection of the face 42 facing the second reflection mirror 5 out of the polarization reflection mirror 4. Further, the anti-reflection coated layer 43 may reduce a noise due to undesired reflected light of the transmitted light.

That is, the polarization reflection mirror 4 may increase an amount of light transmitted through the polarization reflection mirror 4 after being reflected from the second reflection mirror 5 by the anti-reflection coated layer 43.

The linearly-polarized light in the second direction reflected from the second reflection mirror 5 and then incident on the polarization reflection mirror 4 may be incident on the polarization reflection mirror 4 while minimizing the surface reflection by the anti-reflection coated layer 43.

The anti-reflection coated layer 43 may be omitted.

The second reflection mirror 5 is spaced apart from the polarization reflection mirror 4 and may reflect the light transmitted through the polarization reflection mirror 4 to the polarization reflection mirror 4.

The second reflection mirror 5 may be disposed to face the polarization reflection mirror 4. The second reflection mirror 5 is a flat mirror placed facing the polarization reflection mirror 4.

Said one face 51 of the second reflection mirror 5 may face the other face 42 of the polarization reflection mirror 4. Said one face 51 of the second reflection mirror 5 may be a front face facing the forward direction.

The linearly-polarized light in the second direction, which is transmitted through the polarization reflection mirror 4 and is incident on the second reflection mirror 5, may be reflected on said one face 51 of the second reflection mirror 5 and directed to the polarization reflection mirror 4.

The second reflection mirror 5 may be spaced apart from the polarization reflection mirror 4 by a predetermined distance D1.

The second reflection mirror 5 may be disposed parallel to the polarization reflection mirror 4. The second reflection mirror 5 may be disposed to be inclined such that the front face 51 thereof faces the forward and downward direction.

The head-up display of the present disclosure as described above may form a first virtual image K at a first position close to the windshield 6, a second virtual image M at a second position relatively farther away from the windshield 6, and a third virtual image N at a third position more farther away from the windshield 6.

In other words, distances between the windshield 6 and the respective virtual images may gradually become distant in an order of the first virtual image K, the second virtual image M, and the third virtual image N.

The head up display for the vehicle of the present disclosure may form the first virtual image K and the second virtual image M simultaneously or may form the first virtual image K and the third virtual image N simultaneously.

The first virtual image K may be formed by a short-range optical path from the image source 11, through the prism 9, the polarization reflection mirror 4, and the first reflection mirror 3, to the windshield 6.

The second virtual image M may be formed by a medium-range optical path from the image source 11, through the electric polarization conversion element 12 in the turn-off state, the polarization reflection mirror 4, and the second reflection mirror 3, to the windshield 6.

Further, the third virtual image N may be formed by a long-range optical path from the image source 11, through the electric polarization conversion element 12 in the turn-on state, the polarization reflection mirror 4, the second reflection mirror 5, the polarization reflection mirror 4, the first reflection mirror 3, to the windshield 6.

The short-range optical path may be shorter than the medium-optical path due to a difference in a refractive index between the prism 9 and an air.

The long-range optical path may further include a length that the linearly-polarized light in the second direction travels from the polarization reflection mirror 4 to the second reflection mirror 5 and a length that the linearly-polarized light in the second direction reflected from the second reflection mirror 5 travels to the polarization reflection mirror 4. Further, the long-range optical path may further include a length of twice a thickness F of the polarization reflection mirror 4 than the medium-range optical path.

In more detail, the short-range optical path may include a first path T1 along which the linearly-polarized light of the first direction emitted from the imaging mechanism 1 is incident on the prism 9, a second path T2 along which the linearly-polarized light of the first direction retracted through and emitted from the prism 9 is incident on the polarization reflection mirror 4, a third path T3 along which the linearly-polarized light of the first direction reflected from the polarization reflection mirror 4 is incident on the first reflection mirror 3, and a fourth path along which the linearly-polarized light of the first direction reflected from the first reflection mirror 3 is incident on the windshield 6.

The medium-range optical path may include a fifth path T5 along which the linearly-polarized light of the first direction emitted from the imaging mechanism 1 is incident on the electric polarization conversion element 12 in the turn-off state, a sixth path T6 along which the linearly-polarized light of the first direction emitted from the electric polarization conversion element 12 is incident on the polarization reflection mirror 4, a seventh path T7 along which the linearly-polarized light of the first direction reflected from the polarization reflection mirror 4 is incident on the first reflection mirror 3, and an eighth path T8 along which the linearly-polarized light of the first direction reflected from the first reflection mirror 3 is incident on the windshield 6.

The long-range optical path may include a ninth path T9 along which the linearly-polarized light of the first direction is incident on the electric polarization conversion element 12 in the turn-on state, a tenth path T10 along which the linearly-polarized light of the second direction emitted from the electric polarization conversion element 12 is incident on the polarization reflection mirror 4, an eleventh path T11 along which the linearly-polarized light in the second direction transmitted through the polarization reflection mirror 4 is incident on the second reflection mirror 5, a twelfth path T12 along which the linearly-polarized light in the second direction reflected from the second reflection mirror 5 is incident on the polarization reflection mirror 4, a thirteenth path T13 along which the linearly-polarized light in the second direction transmitted through the polarization reflection mirror 4 is incident on the first reflection mirror 3, and a fourteenth path T14 along which the linearly-polarized light ill the second direction reflected from the first reflection mirror 3 is incident on the windshield 6.

A length L3 of the long-range optical path may be longer than a length L2 of the medium-range optical path by a sum of twice the thickness F of the polarization reflection mirror 4, a length of the eleventh path T11, and a length of the twelfth path T12.

Hereinafter, an operation of the present embodiment will be described.

For convenience of description, an example in which the P-wave linearly-polarized light P is emitted from the image source 11 will be described.

First, a case where the electric polarization conversion element 12 is turned off as shown in FIGS. 1 and 2 will be described.

A portion of the P-wave linearly-polarized light P emitted from the image source 11 may be refracted through the prism 9 and directed to the polarization reflection mirror 4 in a state in which a wavelength thereof is not converted. Further, the remaining portion may be transmitted through the electric polarization conversion element 12 and directed to the polarization reflection mirror 4 in a state in which a wavelength thereof is not converted.

The P-wave linearly-polarized light P incident on the front face 41 of the polarization reflection mirror 4 may be reflected from the polarization reflection mirror 4 to the first reflection mirror 3 and may be reflected from the first reflection mirror 3 to the windshield 6.

The driver may recognize the first virtual image K formed by the short-range optical path and the second virtual image M formed by the medium-range optical path through the windshield 6.

The head up display for the vehicle may form the two virtual images K and M with different distances from the windshield 6. As such, the two virtual images K and M having different distances may be recognized by an eye J of the driver boarding the vehicle.

Next, a case where the electric polarization conversion element 12 is turned on as shown in FIGS. 3 and 4 will be described.

A portion of the P-wave linearly-polarized light P emitted from the image source 11 may be refracted through the prism 9 and directed to the polarization reflection mirror 4 in a state in which a wavelength thereof is not converted. Further, the remaining portion may be converted into the S-wave linearly-polarized light S by the electric polarization conversion element 12 and directed to the polarization reflection mirror 4.

The P-wave linearly-polarized light P incident on the front face 41 of the polarization reflection mirror 4 may be reflected from the polarization reflection mirror 4 to the first reflection mirror 3 and may be reflected from the first reflection mirror 3 to the windshield 6.

On the other hand, a portion of the S-wave linearly-polarized light S incident on the front face 41 of the polarization reflection mirror 4 may be transmitted through the polarization reflection mirror 4 and then directed to the second reflection mirror 5, and reflected by the second reflection mirror 5 to the polarization reflection mirror 4. The S-wave linearly-polarized light S reflected from the second reflection mirror 5 to the polarization reflection mirror 4 may be transmitted through the polarization reflection mirror 4 and then directed to the first reflection mirror 3. The S-wave linearly-polarized light S directed to the first reflection mirror 3 may be reflected by the first reflection mirror 3 to the windshield 6.

The driver may recognize the first virtual image K formed by the short-range optical path and the third virtual image N formed by the long-range optical path through windshield 6.

The head up display for the vehicle may form the two virtual images K and N with different distances from the windshield 6. As such, the two virtual images K and N having different distances may be recognized by an eye J of the driver boarding the vehicle.

Further, an example in which the S-wave linearly-polarized light S is emitted from the image source 11 differs from the example in which the P-wave linearly-polarized light P is emitted from the image source 11 only in a type of the linearly-polarized light and operations in both examples are the same. Therefore, a detailed description of the operations will be omitted in order to avoid redundant descriptions.

As a result, the first virtual image K may be formed at the same distance regardless of the turn-on/turn-off state of the electric polarization conversion element 12.

A spacing between the first virtual image K and the second virtual image M may be smaller than a spacing between the first virtual image K and the third virtual image N. That is, the spacing between the two virtual images having different distances may be adjusted as the electric polarization conversion element 12 is turned on/off. Accordingly, based on a distance between the vehicle and an external object, a distance of the virtual image corresponding to an external object may be adjusted. Further, a position of the virtual image may be changed based on information displayed on each virtual image.

For example, the electric polarization conversion element 12 may be controlled based on a distance between the vehicle in motion and a vehicle ahead of the vehicle. The distance to the preceding vehicle may be detected by a distance sensor installed on the vehicle. The electric polarization conversion element 12 may be turned off when the distance to the preceding vehicle is within a first set distance range. In this case, the first virtual image K and the second virtual image M may be formed. On the other hand, the electric polarization conversion element 12 may be turned on when the distance to the preceding vehicle is in a second set distance range, which is a range of a distance farther than a distance in the first set distance range. In this case, the first virtual image K and the third virtual image N may be formed.

Further, the electric polarization conversion element 12 may be turned on/off in a short period. In this case, the eye J of the driver may recognize the second virtual image M and the third virtual image N together. That is, the user may recognize as if the first virtual image K, the second virtual image M, and the third virtual image N are simultaneously formed. Thus, the head up display for the vehicle may provide more information to the user at the same time.

FIG. 5 is a side view illustrating main components when an electric polarization conversion element of a head-up display for a vehicle according to a second embodiment of the present disclosure is turned on. Further, FIG. 6 is an enlarged side view illustrating a quarter-wavelength retarder, a second reflection mirror, and a polarization reflection mirror illustrated in FIG. 5. Further, FIG. 7 is a side view illustrating an optical path when an electric polarization conversion element of a head up display for a vehicle according to a second embodiment of the present disclosure is turned on.

Only a difference between the present embodiment and the first embodiment of the present disclosure is that the present embodiment further includes a quarter-wavelength retarder 7. Other components and operations other than the quarter-wavelength retarder 7 of the present embodiment are the same as or similar to that of the first embodiment of the present disclosure, so that a detailed description of other components and operations of the present embodiment will be omitted.

Referring to FIGS. 5 to 7, the head-up display for the vehicle according to the present embodiment may further include the quarter-wavelength retarder 7 disposed between the polarization reflection mirror 4 and the second reflection mirror 5.

The quarter-wavelength retarder 7 may be a quarter-wave plate that retards a phase of an incident linearly-polarized light by a quarter-wavelength.

One face 74 and the other face 73 of the quarter-wavelength retarder 7 may respectively refer to a pair of relatively wide faces facing each other of an outer face of the quarter-wavelength retarder 7.

One face 74 of the quarter-wavelength retarder 7 may be a front face facing a forward direction and the other face 73 thereof may be a rear face facing a rearward direction.

The quarter-wavelength retarder 7 may be attached to a face out of both faces of the second reflection mirror 5 facing the polarization reflection mirror 4. The quarter-wavelength retarder 7 may be attached to the front face 51 of the second reflection mirror 5.

In combination of the quarter-wavelength retarder 7 and the second reflective mirror 5, the quarter-wavelength retarder 7 and the second reflective mirror 5 may convert the linearly-polarized light in the second direction transmitted through the polarization reflection mirror 4 into the linearly-polarized light in the first direction and reflect the linearly-polarized light in the first direction.

In the present embodiment, disposition angles of the image source 11, the prism 9, the electric polarization conversion element 12, the first reflection mirror 3, the polarization reflection mirror 4, and the second reflection mirror 5 may be the same as that in the first embodiment of the present disclosure and locations of the image source 11, the prism 9, the electric polarization conversion element 12, the first reflection mirror 3, and the polarization reflection mirror 4 may also be the same as that in the first embodiment of the present disclosure.

In the present embodiment, however, a distance D2 between the second reflection mirror 5 and the polarization reflection mirror 4 may be shorter than a distance D1 between the second reflection mirror 5 and the polarization reflection mirror 4 in the first embodiment or the second embodiment of the present disclosure.

In combination with the quarter-wavelength retarder 7 and the second reflection mirror 5, the quarter-wavelength retarder 7 and the second reflection mirror 5 may function as a half-wavelength retarder that reflects the incident linearly-polarized light while converting the wavelength thereof. Further, the quarter-wavelength retarder 7 and the second reflection mirror 5 may induce the linearly-polarized light to be reflected multiple times from the polarization reflection mirror 4 and the second reflection mirror 5 or may reduce a space between the polarization reflection mirror 4 and the second reflection mirror 5.

The second reflection mirror 5 may include a transparent plate 5A and a reflective layer 5B in contact with the transparent plate 5A. The reflective layer 5B may be positioned on the opposite side of the polarization reflection mirror 4 around the transparent plate 5A.

A distance between the second reflection mirror 5 and the quarter-wavelength retarder 7 is preferably as close as possible. The second reflection mirror 5 and the quarter-wavelength retarder 7 are preferably integrated.

The quarter-wavelength retarder 7 may be attached to the front face 51 of the second reflection mirror 5 with an adhesive 72. A rear face 73 of the quarter-wavelength retarder 7 may be attached to the front face 51 of the transparent plate 5A with an adhesive, in particular a transparent adhesive. A front face 74 of the quarter-wavelength retarder 7 may face the polarization reflection mirror 4. The front face 74 of the quarter-wavelength retarder 7 may be spaced apart from the polarization reflection mirror 4.

In the present embodiment, a short-range optical path and a medium-optical path may be the same as that of the first embodiment of the present disclosure and a detailed description thereof will be omitted.

In the present embodiment, some paths of a long-range optical path may be different from the first embodiment of the present disclosure and the remaining paths of the long-range optical path may be the same as that in the first embodiment of the present disclosure.

A ninth path T9, a tenth path T10, a thirteenth path T13, and a fourteenth path T14 of the long-range optical path of the present embodiment may be the same as that of the first embodiment of the present disclosure.

Further, an eleventh path T11A and T11B of the long-range optical path of the present embodiment may be different from the eleventh path T11 of the first embodiment of the present disclosure and a twelfth path T12A and T12B of the long-range optical path of the present embodiment may be different from the twelfth path T12 of the first embodiment of the present disclosure.

The eleventh path T11A and T11B of the present embodiment includes a path T11A along which the linearly-polarized light of the second direction transmitted through the polarization reflection mirror 4 is converted into a circularly-polarized light by the quarter-wavelength retarder 7 and then the circularly-polarized light is incident on the second reflection mirror 5. Further, the eleventh path T11A and T11B further includes a path T11B along which the circularly-polarized light incident on the second reflection mirror 5 is reflected to the quarter-wavelength retarder 7 by the second reflection mirror 5 and then converted into the linearly-polarized light in the first direction by the quarter-wavelength retarder 7, and then the linearly-polarized light in the first direction is incident on the polarization reflection mirror 4.

Further, the twelfth path T12A and T12B includes a path T12A along which the linearly-polarized light in the first direction incident on the polarization reflection mirror 4 from the quarter-wavelength retarder 7 is reflected to the quarter-wavelength retarder 7 by the polarization reflection mirror 4 and then converted into the circularly-polarized light by the quarter-wavelength retarder 7, and then the circularly-polarized light is incident on the second reflection mirror 5. Further, the twelfth path T12A and T12B further includes a path T12B along which the circularly-polarized light incident on the second reflection mirror 5 from the quarter-wavelength retarder 7 is reflected to the quarter-wavelength retarder 7 by the second reflection mirror 5 and converted into the linearly-polarized light in the second direction by the quarter-wavelength retarder 7 and then the linearly-polarized light in the second direction is incident on the polarization reflection mirror 4.

In the present embodiment, the linearly-polarized light transmitted through the polarization reflection mirror 4 may be reflected in a zig-zag shape while changing the wavelength thereof between the polarization reflection mirror 4 and the second reflection mirror 5.

The linearly-polarized light transmitted through the polarization reflection mirror 4 is reflected once by the polarization reflection mirror 4 between the polarization reflection mirror 4 and the second reflection mirror 5 and reflected twice by the second reflection mirror 5, which is three times in total. The present embodiment may place the second reflection mirror 5 closer to the polarization reflection mirror 4 than the first embodiment of the present disclosure due to these reflections of three times.

That is, the present embodiment may reduce a distance between the polarization reflection mirror 4 and the second reflection mirror 5 by the quarter-wavelength retarder 7 and may have a more compact size than the first embodiment.

Hereinafter, an operation of the present embodiment will be described as follows.

For convenience of description, an example in which the P-wave linearly-polarized light P is emitted from the image source 11 will be described as follows. Further, a case where the electric polarization conversion element 12 is turned off is the same as the case of the first embodiment described above. Therefore, only a case where the electric polarization conversion element 12 is turned on will be described.

A portion of the P-wave linearly-polarized light P emitted from the image source 11 is refracted through the prism 9 and directed to the polarization reflection mirror 4 in a state in which the wavelength thereof is not converted. The P-wave linearly-polarized light P incident on the front face of the polarization reflection mirror 4 is reflected to the first reflection mirror 3 by the polarization reflection mirror 4 and then reflected to the windshield 6 by the first reflection mirror 3. In this case, the driver may recognize the first virtual image K formed by the short-range optical path through the windshield 6.

The remaining portion of the P-wave linearly-polarized light P emitted from the image source 11 may be converted into the S-wave linearly-polarized light S by the electric polarization conversion element 12 in the turn-on state and then directed to the polarization reflection mirror 4. The S-wave linearly-polarized light S incident on the front face 41 of the polarization reflection mirror 4 may be transmitted through the polarization reflection mirror 4 and be directed to the second reflection mirror 5.

The S-wave linearly-polarized light S emitted from the polarization reflection mirror 4 toward the second reflection mirror 5 is converted into the circularly-polarized light by the quarter-wavelength retarder 7 and then reflected by the second reflection mirror 5 to the quarter-wavelength retarder 7. Further, the P-wave linearly-polarized light P may be emitted from the quarter-wavelength retarder 7 towards the polarization reflection mirror 4.

The P-wave linearly-polarized light P emitted from the quarter-wavelength retarder 7 toward the polarization reflection mirror 4 may not be transmitted through the polarization reflection mirror 4 but reflected from the rear face 42 of the polarization reflection mirror 4 toward the second reflection mirror 5. The P-wave linearly-polarized light P reflected from the polarization reflection mirror 4 toward the second reflection mirror 5 is converted into the circularly-polarized light by the quarter-wavelength retarder 7 and then reflected by the second reflection mirror 5 to the quarter-wavelength retarder 7 and the S-wave linearly-polarized light S may be emitted from the quarter-wavelength retarder 7 and directed to the polarization reflection mirror 4.

The S-wave linearly-polarized light S emitted from the quarter-wavelength retarder 7 to the polarization reflection mirror 4 may be transmitted through the polarization reflection mirror 4 and then be directed to the first reflection mirror 3. Further, the S-wave linearly-polarized light S directed to the first reflection mirror 3 may be reflected to the windshield 6 by the first reflection mirror 3. In this case, the driver may recognize the third virtual image N formed by the long-range optical path.

An example in which the S-wave linearly-polarized light S emitted from the image source 11 differs from the example in which the P-wave linearly-polarized light P is emitted from the image source 11 only in a type of the linearly-polarized light and operations in both examples are the same. Therefore, a detailed description of the operations will be omitted to avoid redundant descriptions.

FIG. 8 is a side view illustrating main components when an electric polarization conversion element of a head-up display for a vehicle according to a third embodiment of the present disclosure is turned on. Further, FIG. 9 is an enlarged side view illustrating a quarter-wavelength retarder, a second reflection mirror, a polarization reflection mirror, and a third reflection mirror illustrated in FIG. 8.

Other components and operations of the present embodiment are the same as or similar to that of the second embodiment the present disclosure, except that the present embodiment includes a third reflection mirror 8, therefore, a detailed description of other components and operations will be omitted.

Referring to FIGS. 8 and 9, the head up display for the vehicle according to the present embodiment may further include the third reflection mirror 8 disposed on a portion of a front face of the quarter-wavelength retarder 7

The third reflection mirror 8 may be positioned between the quarter-wavelength retarder 7 and the polarization reflection mirror 4.

The third reflection mirror 8 may be a mirror reflecting a light reflected from the polarization reflection mirror 4 back to the polarization reflection mirror 4. The third reflection mirror 8 may be disposed to face the polarization reflection mirror 4 and may be spaced apart from the polarization reflection mirror 4. The third reflection mirror 8 may be attached to the front face of the quarter-wavelength retarder 7. The third reflection mirror 8 may be attached to the front face of the quarter-wavelength retarder 7 at a distance from the polarization reflection mirror 4.

The third reflection mirror 8 may be a flat mirror attached to the front face of the quarter-wavelength retarder 7.

The third reflection mirror 8 may include a transparent plate 80A and a reflective layer 80B positioned between the transparent plate 80A and the quarter-wavelength retarder 7.

The third reflection mirror 8 may be attached to the front face of the quarter-wavelength retarder 7 by an adhesive.

The reflective layer 80B of the third reflection mirror 8 may be attached to the front face of the quarter-wavelength retarder 7.

The third reflection mirror 8 may be smaller than the second reflection mirror 5 and smaller than the quarter-wavelength retarder 7.

In the present embodiment, the quarter-wavelength retarder 7, the second reflection mirror 5, and the third reflection mirror 8 may be configured in one mirror assembly.

This mirror assembly may include a reflection region where the third reflection mirror 8 is located and a wavelength conversion and reflection region where the third reflection mirror 8 is not located.

The reflection region may be a first region where the linearly-polarized light reflected from the polarization reflection mirror 4 is totally reflected to the polarization reflection mirror 4 without wavelength conversion.

Further, the wavelength conversion and reflection region may be a second region where the linearly-polarized light reflected from the polarization reflection mirror 4 is transmitted through the quarter-wavelength retarder 7 and then reflected on the second reflection mirror 5 back to the quarter-wavelength retarder 7.

An operation of the present embodiment will be described in detail with reference to FIGS. 8 and 9 as follows. Hereinafter, an example in which the P-wave linearly-polarized light P is emitted from the image source 11 will be described for convenience. Further, a case where the electric polarization conversion element 12 is turned off is the same as the case of the first embodiment described above. Therefore, only a case where the electric polarization conversion element 12 is turned on will be described.

The P-wave linearly-polarized light P emitted from the image source 11 may be wavelength converted into the S-wave linearly-polarized light S at the electric polarization conversion element 12 in the turn-on state and then may be transmitted through the polarization reflection mirror 4. The S-wave linearly-polarized light S transmitted through the polarization reflection mirror 4 may be directed to the second reflection mirror 5 as in the second embodiment of the present disclosure. Then, the S-wave linearly-polarized light S may be converted into the circularly-polarized light by the quarter-wavelength retarder 7, and then reflected to the quarter-wavelength retarder 7 by the second reflection mirror 5. From the quarter-wavelength retarder 7, the S-wave linearly-polarized light S may be emitted towards the polarization reflection mirror 4 as in the second embodiment of the present disclosure.

The P-wave linearly-polarized light P emitted from the quarter-wavelength retarder 7 toward the polarization reflection mirror 4 may not be transmitted through the polarization reflection mirror 4 as in the second embodiment of the present disclosure, but may be reflected from the rear face of the polarization reflection mirror 4. The P-wave linearly-polarized light P reflected from the polarization reflection mirror 4 may be incident on the third reflection mirror 8 and then totally reflected to the polarization reflection mirror 4 by the third reflection mirror 8 as shown in FIG. 9.

The P-wave linearly-polarized light P reflected to the polarization reflection mirror 4 by the third reflection mirror 8 may not be transmitted through the polarization reflection mirror 4, but may be reflected from the rear face of the polarization reflection mirror 4 toward the second reflection mirror 5. The P-wave linearly-polarized light reflected from the rear face of the polarization reflection mirror 4 toward the second reflection mirror 5 may be converted into the circularly-polarized light by the quarter-wavelength retarder 7 and then reflected from the second reflection mirror 5 to the quarter-wavelength retarder 7. From the quarter-wavelength retarder 7, the P-wave linearly-polarized light P may be emitted and directed to the polarization reflection mirror 4 as in the second embodiment of the present disclosure.

As in the second embodiment of the present disclosure, the S-wave linearly-polarized light S emitted to the polarization reflection mirror 4 from the quarter-wavelength retarder 7 may be directed to the first reflection mirror 3 after being transmitted through the polarization reflection mirror 4. The S-wave linearly-polarized light S directed to the first reflection mirror 3 may be reflected to the windshield 6 by the first reflection mirror 3. In this case, the driver may recognize a third virtual image N formed by a long-range optical path.

In the present embodiment, the third virtual image N may be formed at a longer distance than that of the second embodiment of the present disclosure. The present embodiment may further include an optical path from the rear face of the polarization reflection mirror 4 to the third reflection mirror 8 and an optical path from the third reflection mirror 8 to the rear face of the polarization reflection mirror 4. Due to these two optical paths, the third virtual image N may be formed at a longer distance than that of the second embodiment of the present disclosure.

When it is assumed that the distances at which the third virtual image N is formed are the same in the present embodiment and the second embodiment of the present disclosure, a distance D3 between the polarization reflection mirror 4 and the second reflection mirror 5 of the present embodiment may be smaller than the distance D2 between the polarization reflection mirror 4 and the second reflection mirror 5 of the second embodiment of the present disclosure. In this case, a width in a front and rear direction of the head-up display for the vehicle may be smaller than that of the second embodiment of the present disclosure.

FIG. 10 is a side view in which a first virtual image and a second virtual image are inclined when a polarization reflection mirror of a head up display for a vehicle according to a fourth embodiment of the present disclosure rotates. Further, FIG. 11 is a side view in which a third virtual image is inclined when a second reflection mirror of a head up display for a vehicle according to a fourth embodiment of the present disclosure rotates.

Hereinafter, the same contents as those described above will be omitted and differences will be mainly described.

The present embodiment may further include a first rotating mechanism 60 that rotates one of the polarization reflection mirror 4 and the second reflection mirror 5. The present embodiment may further include a second rotating mechanism 70 that rotates the other of the polarization reflection mirror 4 and the second reflection mirror 5.

When the present embodiment includes only the first rotating mechanism 60 and does not include the second rotating mechanism 70, the head up display for the vehicle may adjust only a slope of a first virtual image K and K' and a slope of a second virtual image M and M' and may not adjust a slope of a third virtual image N and N'. Conversely, when the present embodiment includes only the second rotating mechanism 70 and does not include the first rotating mechanism 60, the head up display for the vehicle may adjust only the slope of the third virtual image N and N' and may not adjust the slope of the first virtual image K and K' and the slope of the second virtual image M and M'.

The present embodiment may include both the first rotating mechanism 60 and the second rotating mechanism 70, in this case, the slope of the first virtual image K and K' and the slope of the second virtual image M and M' may be adjusted by the first rotating mechanism 60 and the slope of the third virtual image N and N' may be adjusted by the second rotating mechanism 70.

Hereinafter, an example in which the present embodiment includes both the first rotating mechanism 60 and the second rotating mechanism 70 will be described for the sake of convenience.

The first rotating mechanism 60 may be a polarization reflection mirror rotating mechanism that is connected to one side of the polarization reflection mirror 4 and rotates the polarization reflection mirror 4.

The first rotating mechanism 60 may include a motor and a rotation axis of the motor may be connected to a rotation center of the polarization reflection mirror 4 to rotate the polarization reflection mirror 4 directly. The first rotating mechanism 60 may include the motor and a power transmitting member connected to the motor and connected to a rotation axis of the polarization reflection mirror 4. The polarization reflection mirror 4 may be rotated via the power transmitting member.

It is preferable that the first rotating mechanism 60 rotates the polarization reflection mirror 4 at an angle at which the polarization reflection mirror 4 is not to be in contact with the second reflection mirror 5 when the polarization reflection mirror 4 rotates.

The first rotating mechanism 60 may rotate the polarization reflection mirror 4 in a clockwise or counterclockwise direction by a predetermined angle. Then, the polarization reflection mirror 4 may be rotated to be disposed at an angle to the second reflection mirror 5 from a state in which the polarization reflection mirror 4 is in parallel with the second reflection mirror 5, as shown in FIG. 10.

During the rotation of the polarization reflection mirror 4, a reflection angle of the polarization reflection mirror 4 varies, and a first virtual image K' formed at a short distance L1 from the windshield 6 and a second virtual image M' formed at a medium distance L2 may be inclined at a predetermined angle, as shown in FIG. 10.

Conversely, the first rotating mechanism 60 may reversely rotate the polarization reflection mirror 4 to be parallel to the second reflection mirror 5. In this case, the first virtual image K located at a long distance from the windshield 6 may be vertical.

The second rotating mechanism 70 may be a second reflection mirror rotating mechanism that is connected to one side of the second reflection mirror 5 to rotate the second reflection mirror 5.

The second rotating mechanism 70 may include a motor and a rotation axis of the motor may be connected to a rotation center of the second reflection mirror 5 to rotate the second reflection mirror 5 directly. The second rotating mechanism 70 may include the motor and a power transmitting member connected to the motor and connected to a rotation axis of the second reflection mirror 5. Further, the second reflection mirror 5 may be rotated via the power transmitting member.

It is preferable that the second rotating mechanism 70 rotates the second reflection mirror 5 at an angle at which the second reflection mirror 5 is not to be in contact with the polarization reflection mirror 4 when the second reflection mirror 5 rotates.

The second rotating mechanism 70 may rotate the second reflection mirror 5 in a clockwise or counterclockwise direction by a predetermined angle. Then, the second reflection mirror 5 may be rotated to be disposed at an angle to the polarization reflection mirror 4 from a state in which the second reflection mirror 5 is in parallel with the polarization reflection mirror 4, as shown in FIG. 11.

During the rotation of the second reflection mirror 5, a reflection angle of the second reflection mirror 5 varies, and a third virtual image N' formed at a long distance L3 from the windshield 6 may be inclined at a predetermined angle, as shown in FIG. 11.

Conversely, the second rotating mechanism 70 may reversely rotate the second reflection mirror 5 to be parallel to the polarization reflection mirror 4. In this case, the third virtual image N located at a long distance from the windshield 6 may be vertical.

FIG. 12 is a side view illustrating main components when an electric polarization conversion element of a head-up display for a vehicle according to a fifth embodiment of the present disclosure is turned off. Further, FIG. 13 is a side view illustrating main components when an electric polarization conversion element of a head-up display for a vehicle according to a fifth embodiment of the present disclosure is turned on. Further, FIG. 14 is an enlarged side view illustrating a linear polarizer, a prism, an electric polarization conversion element, and a separating partition illustrated in FIG. 13.

Referring to FIGS. 12 to 14, the imaging mechanism 1 of the present embodiment may further include a separating partition 100 for improving an image quality of the virtual image K, M, and N. Other components and operations other than the separating partition 100 of the present embodiment are the same as or similar to the first embodiment of the present disclosure, and thus the same reference numerals are used and a detailed description of other components and operations will be omitted.

The imaging mechanism 1 of the present embodiment may further include the separating partition 100.

The separating partition 100 may improve an image quality of an image light emitted from the head up display for the vehicle towards the vehicle's windshield 6. In more detail, the separating partition 100 may prevent virtual images K, M, and N respectively formed by the image light from being viewed to be overlapped with each other or interfering with each other and may remove unnecessary peripheral image of each the virtual images K, M, and N.

The separating partition 100 may prevent mutual interference of the linearly-polarized light transmitted through the prism 9 of the imaging mechanism 1 and the linearly-polarized light transmitted through the electric polarization conversion element 12.

The separating partition 100 may be disposed between the light emitting face of the image source 11 and one face 41 of the polarization reflection mirror 4. In more detail, the separating partition 100 may be disposed between the light emitting face 14B of the linear polarizer 14 and one face 41 of the polarization reflection mirror 4.

The separating partition 100 may be disposed to be in contact with the light emitting face of the image source 11. In more detail, the separating partition 100 may be disposed to be in contact with the light emitting face 14B of the linear polarizer 14.

The separating partition 100 may have a predetermined vertical level in a direction from the image source 11 to the polarization reflection mirror 4. The separating partition 100 may be disposed above the image source 11.

The separating partition 100 may be disposed to be inclined at a predetermined angle.

The prism 9 may be located on one side of the separating partition 100. The electric polarization conversion element 12 may be spaced apart from the separating partition 100 or may be in contact with each other. That is, the separating partition 100 may be disposed between the prism 9 and the electric polarization conversion element 12.

The prism 9 and the electric polarization conversion element 12 may be separated from the separating partition 100, or may be installed to be in contact with the separating partition 100.

The separating partition 100 may divide the light emitting face 14B of the linear polarizer 14 into a first light emitting region U and a second light emitting region V.

The first light emitting region U may be a portion of the light emitting face 14B of the linear polarizer 14 located on one side of the separating partition 100 and the second light exit region V may be a portion of the light emitting face 14B of the linear polarizer 14 located on the other side of the separating partition 100.

The prism 9 may overlap with the first emitting region U in the vertical direction and the electric polarization conversion element 12 may overlap with the second emitting region V in the vertical direction.

The first emitting region U may face the prism 9 and the separating partition 100. Alternatively, the first emitting region U may face only the prism 9.

The first emitting region U may not be exposed in an upward direction and may not face one face 41 of the polarization reflection mirror 4.

The second emitting region V may view electric polarization conversion element 12 and the separating partition 100. The second emitting region V may only view the electric polarization conversion element 12.

At least a portion of the linearly-polarized light emitted to the first emitting region U of the linear polarizer 14 may be incident on and refracted through the prism 9.

At least a portion of the linearly-polarized light emitted to the second emitting region V of the linear polarizer 14 may be incident on electric polarization conversion element 12. In this connection, when the electric polarization conversion element 12 is turned on, the light incident on the electric polarization conversion element 12 may be half-wavelength converted. On the other hand, when the electric polarization conversion element 12 is turned off, the light incident on the electric polarization conversion element 12 may not be half-wavelength converted, but may be transmitted through the electric polarization conversion element 12.

A light that is not transmitted through the prism 9 out of the linearly-polarized light emitted to the first emitting region U may be blocked or reflected by the separating partition 100 and may not be directed to the polarization reflection mirror 4. Further, a light that is not transmitted through the electric polarization conversion element 12 out of the linearly-polarized light emitted to the second emitting region V may be blocked or reflected by the separating partition 100 and may not be directed to the polarization reflection mirror 4.

That is, an unnecessary linearly-polarized light forming a peripheral image of the virtual image out of the linearly-polarized light emitted from the image source 11 may be blocked by the separating partition 100.

The separating partition 100 may include a first partition 110 and a second partition 120.

The first partition 110 and the second partition 120 may be formed of a plate member, respectively.

The first partition 110 and the second partition 120 may be integrally formed with each other or may be formed separately from each other.

Lengths or vertical levels of the first partition 110 and the second partition 120 may be different from each other or may be the same.

The half-wavelength retarder 12 may be located on the opposite side of the second partition 120 around the first partition 110.

The first partition 110 and the second partition 120 may be arranged at a certain angle θ3.

Each of the partitions 110 and 120 may be disposed at a predetermined angle with the light emitting face of the image source 11. The light emitting face of the image source 11 may refer to the light emitting face 14B of the linear polarizer 14.

Angles between the light emitting face of the image source 11 and respective partitions 110 and 120 may be different from each other.

An angle θ1 between the first partition 110 and the light emitting face 14B of the linear polarizer 14 may be different from an angle θ2 between the second partition 120 and the light emitting face 14B of the linear polarizer 14.

The angle θ1 between the first partition 110 and the light emitting face 14B of the linear polarizer 14 and the angle θ2 between the second partition 120 and the light emitting face 14B of the linear polarizer 14 may be acute.

One of the first partition 110 and the second partition 120 may be disposed perpendicular to the light emitting face 14B of the linear polarizer 14 and the other of the first partition 110 and the second partition 120 may be disposed at an acute angle with the light emitting face 14B of the linear polarizer 14.

The second partition 120 may become more distant from the first partition 110 as the second partition 120 becomes more distant from the light emitting face of the image source 11. In more detail, a distance between the first partition 110 and the second partition 120 may become larger as a distance from the image source 11 increases.

For example, the distance between the partitions 110 and 120 may be minimum at respective ends 112 and 122 on an image source 11 side of the partitions 110 and 120 and may be maximum at the other ends 111 and 121.

The arrangement relationship of the first partition 110 and the second partition 120 may prevent the light emitted from the first light emitting region U and the light emitted from the second light emitting region V from overlapping or interfering with each other and may improve a reliability of the separating partition 100.

The respective ends 111 and 121 far away from the image source 11 of both ends of the respective partitions 110 and 120 may be formed in a sharp manner.

The first partition 110 and the second partition 120 may be spaced apart from each other. However, in order to prevent unnecessary loss of the light emitted from the linear polarizer 14, it is preferable that the first partition 110 and the second partition 120 are disposed in contact with each other. In more detail, the respective ends 112 and 122 on the image source 11 side of the first partition 110 and the second partition 120 may be in contact with each other.

The respective one ends 112 and 122 of the partitions 110 and 120 may be disposed in contact with the light emitting face of the image source 11. In more detail, said one end 112 of the first partition 110 and said one end 122 of the second partition 120 may be in contact with the light emitting face 14B of the linear polarizer 14.

A vertical distance from the light emitting face of the image source 11 to the prism 9 may be smaller than a vertical distance from the light emitting face of the image source 11 to the upper end 111 of the first partition 110. Further, a vertical distance from the light emitting face of the image source 11 to the electric polarization conversion element 12 may be smaller than a vertical distance from the light emitting face of the image source 11 to the upper end 121 of the second partition 120.

In this case, an upper end of the separating partition 100 may be located above the half-wavelength retarder 12. In more detail, the upper end 111 of the first partition 110 may be located above the electric polarization conversion element 12.

A portion of the prism 9 may be overlapped with the first partition 110 in the vertical direction and a portion of the electric polarization conversion element 12 may be overlapped with the second partition 120 in the vertical direction. Thus, the prism 9 and the electric polarization conversion element 12 may block a portion of the light forming an unnecessary peripheral image.

A space 130 with an open top may be defined in the separating partition 100. In more detail, the space 130 opened to face said one face 41 of the polarization reflection mirror 4 may be defined between the first partition 110 and the second partition 120. The space 130 may serve as a light trap.

When the space 130 with the open top is not defined in the separating partition 100, a light out of the light emitted from the imaging mechanism 1 deviating from a defined optical path or an external light entered an interior of the head up display for the vehicle from the outside may be reflected from the top face of the separating partition 100, so that there is a concern that the image quality of each virtual image K, M, and N may be reduced or unnecessary virtual image may be formed.

The space 130 between the first partition 110 and the second partition 120 may reflect the external light or the like from the inside to trap the external light or the like. This improves the image quality of the virtual image K, M, and N and prevents the unnecessary virtual image from being viewed by a user.

In order to effectively trap the external light of the head up display, the space 130 between the first partition 110 and the second partition 120 may be defined to face a portion where the external light enters. The external light may be a sunlight entering through windshield 6 and this sunlight may enter from above the first reflection mirror 3. Thus, the separating partition 100 may be disposed such that the space 130 between the first partition 110 and the second partition 120 faces above the first reflection mirror 3.

Alternatively, the separating partition 100 may be disposed such that the space 130 between the first partition 110 and the second partition 120 faces between the first reflection mirror 3 and the polarization reflection mirror 4. In more detail, the separating partition 100 may be disposed such that the space 130 between the first partition 110 and the second partition 120 faces the reflective surface 32 of the first reflective mirror 3 and said one face 41 of the polarization reflective mirror 4.

Further, the first partition 110 and/or the second partition 120 may have a protrusion 113 protruding in an outward direction. In this connection, the outward direction may be a direction towards the opposite side of the space 130 defined between the partitions 110 and 120.

The protrusion 113 may protrude perpendicularly to the respective partitions 110 and 120, but is not limited thereto.

The protrusion 113 may be formed at the end 111 and 121 of both ends of the respective first partition 110 and/or the second partition 120 far from the image source 11.

The protrusion 113 may serve as a light trap. The protrusion 113 may block a linearly-polarized light forming an unnecessary peripheral image of the virtual image out of the linearly-polarized lights emitted from image source 11.

The protrusion 113 formed on the first partition 110 may protrude toward the first emitting region U. That is, the protrusion 113 formed on the first partition 110 may protrude toward the prism 9.

Due to a gap between the prism 9 and the first partition 110, there is a concern that a portion of the linearly-polarized light of the first direction emitted from the first emitting region U of the linear polarizer 14 may be directly directed to the polarization reflection mirror 4 without being refracted through the prism 9. The protrusion 113 formed on the first partition 110 may serve to block this linearly-polarized light.

When the protrusion is formed on the second partition 120, the protrusion may protrude towards the electric polarization conversion element 12.

Due to a gap between the electric polarization conversion element 12 and the second partition 120, there is a concern that a portion of the linearly-polarized light of the first direction emitted from the second emitting region V of the linear polarizer 14 may be directly directed to the polarization reflection mirror 4 without being transmitted through the electric polarization conversion element 12. The protrusion formed on the second partition 120 may serve to block this linearly-polarized light.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments.

The scope of the present disclosure should be construed as being covered by the scope of the appended claims, and all technical ideas falling within the scope of the claims should be construed as being included in the scope of the present disclosure.

What is claimed is:

1. A head up display for a vehicle comprising:
   an image source for emitting a linearly-polarized light in a first direction;
   a prism for refracting a portion of the linearly-polarized light emitted from the image source;
   an electric polarization conversion element for transmitting the remaining portion of the linearly-polarized light emitted from the image source when the electric polarization conversion element is turned off and for half-wavelength converting the remaining portion of the linearly-polarized light emitted from the image source into a linearly-polarized light in a second direction orthogonal to the first direction when the electric polarization conversion element is turned on;
   a first reflection mirror for reflecting a light to a windshield of the vehicle;
   a polarization reflection mirror spaced apart from the first reflection mirror, wherein the polarization reflection mirror reflects the linearly-polarized light in the first direction and transmits the linearly-polarized light in the second direction; and
   a second reflection mirror spaced apart from the polarization reflection mirror, wherein the second reflection mirror reflects the light transmitted through the polarization reflection mirror to the polarization reflection mirror.

2. The head up display for the vehicle of claim 1, wherein the image source includes:
   a display panel for emitting an image light; and
   a linear polarizer for linearly polarizing the image light emitted from the display panel in the first direction,
   wherein the prism and the electric polarization conversion element are smaller than the linear polarizer, respectively.

3. The head up display for the vehicle of claim 2, wherein the prism and the electric polarization conversion element face different regions of the linear polarizer, respectively.

4. The head up display for the vehicle of claim 2, wherein the linear polarizer includes:
   a first region facing the prism; and
   a second region facing one face of the electric polarization conversion element.

5. The head up display for the vehicle of claim 2, wherein the prism and the electric polarization conversion element are arranged in a front and rear direction.

6. The head up display for the vehicle of claim 2, wherein the prism includes:
   a first face facing the polarization reflection mirror, wherein the first face is inclined; and
   a second face facing the linear polarizer.

7. The head up display for the vehicle of claim 1, wherein the prism and the electric polarization conversion element are disposed between a light emitting face of the image source and one face of the polarization reflection mirror.

8. The head up display for the vehicle of claim 1, wherein the polarization reflection mirror is located above the prism and the electric polarization conversion element and behind the first reflection mirror.

9. The head up display for the vehicle of claim 1, wherein the polarization reflection mirror is a wire grid polarizer disposed behind the first reflection mirror, and
   wherein the second reflection mirror includes a flat mirror disposed facing the polarization reflection mirror.

10. The head up display for the vehicle of claim 1, wherein the polarization reflection mirror is inclined such that one face thereof on which the linearly-polarized light emitted from the image source is incident faces a forward and downward direction, and
    wherein the second reflection mirror is inclined in the same direction as the polarization reflection mirror.

11. The head up display for the vehicle of claim 1, wherein the polarization reflection mirror is disposed to be inclined and disposed between the first reflection mirror and the second reflection mirror in a front and rear direction.

12. The head up display for the vehicle of claim 1, further comprising a separating partition disposed between the prism and the electric polarization conversion element.

13. The head up display for the vehicle of claim 12, wherein the separating partition includes:
    a first partition having a predetermined angle with a light emitting face of the image source; and
    a second partition disposed to be more distant from the first partition as the second partition becomes more distant from the light emitting face of the image source.

14. The head up display for the vehicle of claim 13, wherein a space facing between the first reflection mirror and the polarization reflection mirror is defined between the first partition and the second partition.

15. The head up display for the vehicle of claim 13, wherein an outwardly protruding protrusion is formed on the first partition and/or the second partition.

16. The head up display for the vehicle of claim 1, wherein a second face of the prism and one face of the electric polarization conversion element are coplanar.

* * * * *